US009617439B2

(12) United States Patent
Matsuyama et al.

(10) Patent No.: US 9,617,439 B2
(45) Date of Patent: Apr. 11, 2017

(54) INK COMPOSITION, INK CARTRIDGE, INK RECORDING DEVICE, AND RECORDED MATTER

(71) Applicants: Akihiko Matsuyama, Shizuoka (JP); Shigeyuki Harada, Shizuoka (JP); Keita Katoh, Shizuoka (JP); Masayuki Fukuoka, Shizuoka (JP); Mitsuru Naruse, Shizuoka (JP); Kazukiyo Nagai, Shizuoka (JP); Yuusuke Koizuka, Shizuoka (JP); Masayasu Nonogaki, Shizuoka (JP)

(72) Inventors: Akihiko Matsuyama, Shizuoka (JP); Shigeyuki Harada, Shizuoka (JP); Keita Katoh, Shizuoka (JP); Masayuki Fukuoka, Shizuoka (JP); Mitsuru Naruse, Shizuoka (JP); Kazukiyo Nagai, Shizuoka (JP); Yuusuke Koizuka, Shizuoka (JP); Masayasu Nonogaki, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 226 days.

(21) Appl. No.: 14/625,051

(22) Filed: Feb. 18, 2015

(65) Prior Publication Data

US 2015/0252203 A1 Sep. 10, 2015

(30) Foreign Application Priority Data

Mar. 6, 2014 (JP) .................................. 2014-044102
Mar. 25, 2014 (JP) .................................. 2014-061582
Aug. 29, 2014 (JP) .................................. 2014-175817

(51) Int. Cl.
*C09D 11/322* (2014.01)
*C08K 5/3437* (2006.01)
*C08K 5/29* (2006.01)
*C09D 11/106* (2014.01)
*C09D 11/326* (2014.01)

(52) U.S. Cl.
CPC .............. *C09D 11/322* (2013.01); *C08K 5/29* (2013.01); *C08K 5/3437* (2013.01);
(Continued)

(58) Field of Classification Search
CPC .................................................... C09D 11/322
(Continued)

(56) References Cited

U.S. PATENT DOCUMENTS

2012/0328854 A1 12/2012 Matsuyama et al.
2014/0072779 A1* 3/2014 Matsuyama ......... C09D 11/322
428/195.1
(Continued)

FOREIGN PATENT DOCUMENTS

| JP | 58-222095 | 12/1983 |
| JP | 2002-138233 | 5/2002 |
| JP | 2003-003110 | 1/2003 |
| JP | 2009-513802 | 4/2009 |
| JP | 2012-051357 | 3/2012 |
| JP | 2014-065890 | 4/2014 |
| WO | WO2007/053563 A2 | 5/2007 |

*Primary Examiner* — Doris Lee
(74) *Attorney, Agent, or Firm* — Cooper & Dunham LLP

(57) ABSTRACT

An ink composition contains (a) a pigment represented by chemical formula 1a or chemical formula 1b, (b) a polymer having a structure unit having a diphosphonic acid group and represented by Chemical formula 2, (c) a hydrosoluble solvent, and (d) water.

(Continued)

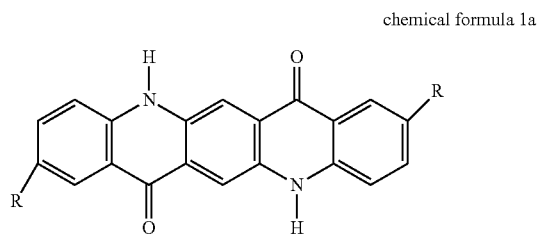

chemical formula 1a

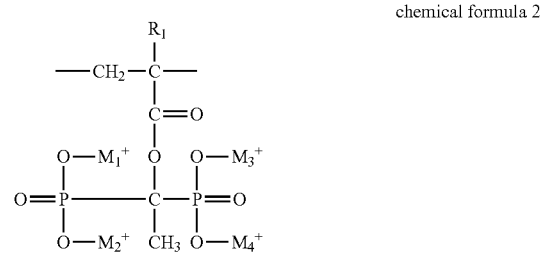

chemical formula 2

10 Claims, 7 Drawing Sheets chemical formula 1b

(52) U.S. Cl.
CPC .......... *C09D 11/106* (2013.01); *C09D 11/326* (2013.01); *Y10T 428/24901* (2015.01)

(58) Field of Classification Search
USPC ........................................................ 428/207
See application file for complete search history.

(56) References Cited

U.S. PATENT DOCUMENTS

| | | | |
|---|---|---|---|
| 2014/0092180 A1* | 4/2014 | Matsuyama | C09D 11/322 347/86 |
| 2014/0120331 A1 | 5/2014 | Koizuka et al. | |
| 2014/0141209 A1 | 5/2014 | Koizuka et al. | |
| 2014/0199530 A1 | 7/2014 | Katoh et al. | |
| 2014/0242352 A1 | 8/2014 | Naruse et al. | |
| 2015/0056425 A1* | 2/2015 | Nagai | C09D 11/10 428/207 |

* cited by examiner

INK COMPOSITION, INK CARTRIDGE, INK RECORDING DEVICE, AND RECORDED MATTER

CROSS-REFERENCE TO RELATED APPLICATIONS

This patent application is based on and claims priority pursuant to 35 U.S.C. §119(a) to Japanese Patent Application Nos. 2014-044102, 2014-061582, and 2014-175817, filed on Mar. 6, 2014, Mar. 25, 2014, and Aug. 29, 2014, in the Japan Patent Office, the entire disclosures of which are hereby incorporated by reference herein.

BACKGROUND

Technical Field

The present invention relates to an ink composition, an ink cartridge, an ink jet recording device, and recorded matter.

Background Art

Inkjet printers have been drastically diffusing because of their advantages such as low acoustic noises and low running costs and printers capable of printing color images on plain paper are introduced into the market actively. However, it is extremely difficult to satisfy all the properties required of images such as color reproducibility, abrasion resistance, durability, light resistance (fastness), drying property, feathering, color bleed, duplex printing, and ink discharging stability. As a result, the ink used is selected based on the prioritized particular application.

In general, the ink for use in inkjet printers is mainly composed of water, with a coloring agent (colorant) and a hydrosoluble solvent such as glycerin to prevent clogging, etc. As the colorant, dyes are widely used for their excellent coloring and stability. However, the light resistance and water resistance of images of dyes are insufficient. Water resistance is improved to some degree by using special recording media for inkjet having an ink absorbing layer, but is not satisfactory when it comes to plain paper.

To compensate for such defects, ink using a pigment has begun to be used as a colorant. Although pigment ink is successful and superior to dye ink with regard to light resistance, water resistance, etc., the coloring of pigment ink is degraded by coherence of beams of light having different wavelengths and phases produced by multiple reflections of the beams of light within the pigment. For this reason, pigment ink is considered to be inferior to dye ink in general with regard to coloring.

In an attempt to compensate for such degradation of coloring of pigment ink, pigment particulates that are coated with resin are used. According to this method, the fixing property and the gas resistance property of the pigment ink are further improved by a resin, and in addition dispersion is greatly stabilized. However, currently, pigment ink is not still on a par with dye ink with regard to gloss.

In addition, high performance is demanded upon increasing demand in industry. As printing performance is improved, inkjet printers having line heads are proposed. In attempts to improve the performance, a device for quick drying by adding a permeating agent to an ink to permeate water into a recording medium is proposed to speed up drying of the ink attached to a recording medium.

However, the permeating property of the pigment is also improved in addition to that of water, thereby degrading image density. In addition, discharging stability is not satisfactory so that further improvement is desired.

Moreover, plain paper involves problems when it is used as a recording medium such that the surface of the plain paper swells by water serving as the solvent of an ink immediately after printing, which causes the difference of elongation ratio between both surfaces of the plain paper wider, resulting in occurrence of curling. This kind of phenomenon is not a problem for printing at low speeds since it is canceled as drying proceeds. However, as the printing speed increases, recording media are transferred before curling is canceled, which naturally results in paper jam. Increasing the content of an organic solvent in an ink suffices for curling. However, the hydhydrophobicity of the ink becomes strong, which makes it difficult to secure storage stability.

In view of the foregoing, ink compositions are demanded that improve coloring, which is an issue for conventional pigment inks, and have excellent storage stability and discharging stability.

SUMMARY

The present invention provides an improved ink composition which contains a pigment, a polymer having a structure unit having a diphosphonic acid group, a hydrosoluble solvent, and water, and satisfies the following (A) and (B). (A): The pigment is represented by the following chemical formula 1a or chemical formula 1b. When the pigment is represented by Chemical formula 1a, the pigment satisfies the relation 1: $Y/X \le 0.800$, where X represents a peak intensity at a Bragg ($2\theta \pm 0.2°$) angle in a range of $2\theta$ of from $5.5°$ to $6.0°$ and Y represents a peak intensity at a Bragg ($2\theta \pm 0.2°$) angle in a range of $2\theta$ of from $26.5°$ to $27.5°$, in a CuKα X-ray diffraction spectrum having a wavelength of 1.541 Å,

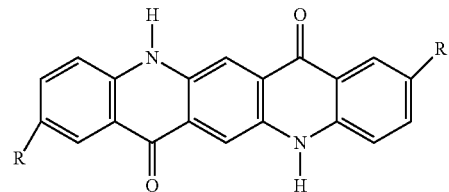

Chemical formula 1a where R each, independently represents hydrogen atoms, methyl groups, or chlorine atoms, when the pigment is represented by Chemical formula 1b, the pigment satisfies the relation 2: $Y'/X' \le 0.200$, where X' represents a peak intensity at a Bragg ($2\theta \pm 0.2°$) angle in a range of $2\theta$ of from $26.5°$ to $27.5°$ and Y' represents a peak intensity at a Bragg ($2\theta \pm 0.2°$) angle in a range of $2\theta$ of from $11.0°$ to $11.5°$, in a CuKα X-ray diffraction spectrum having a wavelength of 1.541 Å,

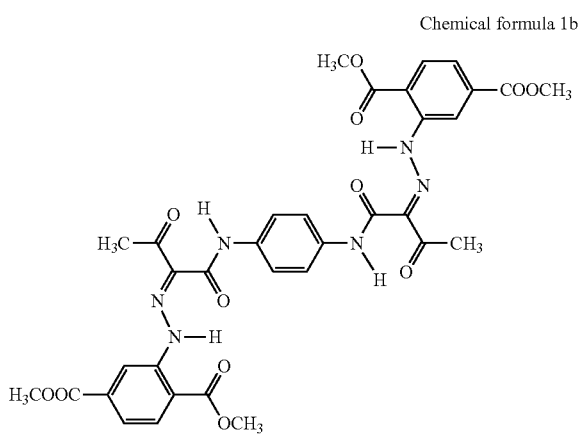

Chemical formula 1b (B) the structure unit having a diphosphonic acid group is represented by Chemical formula 2

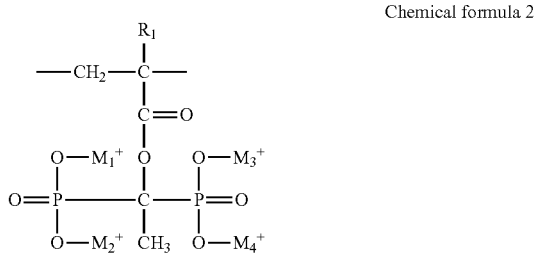

Chemical formula 2 where $R_1$ represents a hydrogen atom or a methyl group and $M_1^+$, $M_2^+$, $M_3^+$, and $M_4^+$ each, independently represents alkali metal ions, organic ammonium ions, or hydrogen ions.

BRIEF DESCRIPTION OF THE SEVERAL VIEWS OF THE DRAWINGS

Various other objects, features and attendant advantages of the present invention will be more fully appreciated as the same become better understood from the detailed description when considered in connection with the accompanying drawings, in which like reference characters designate corresponding parts throughout and wherein.

DETAILED DESCRIPTION

Figure 1:
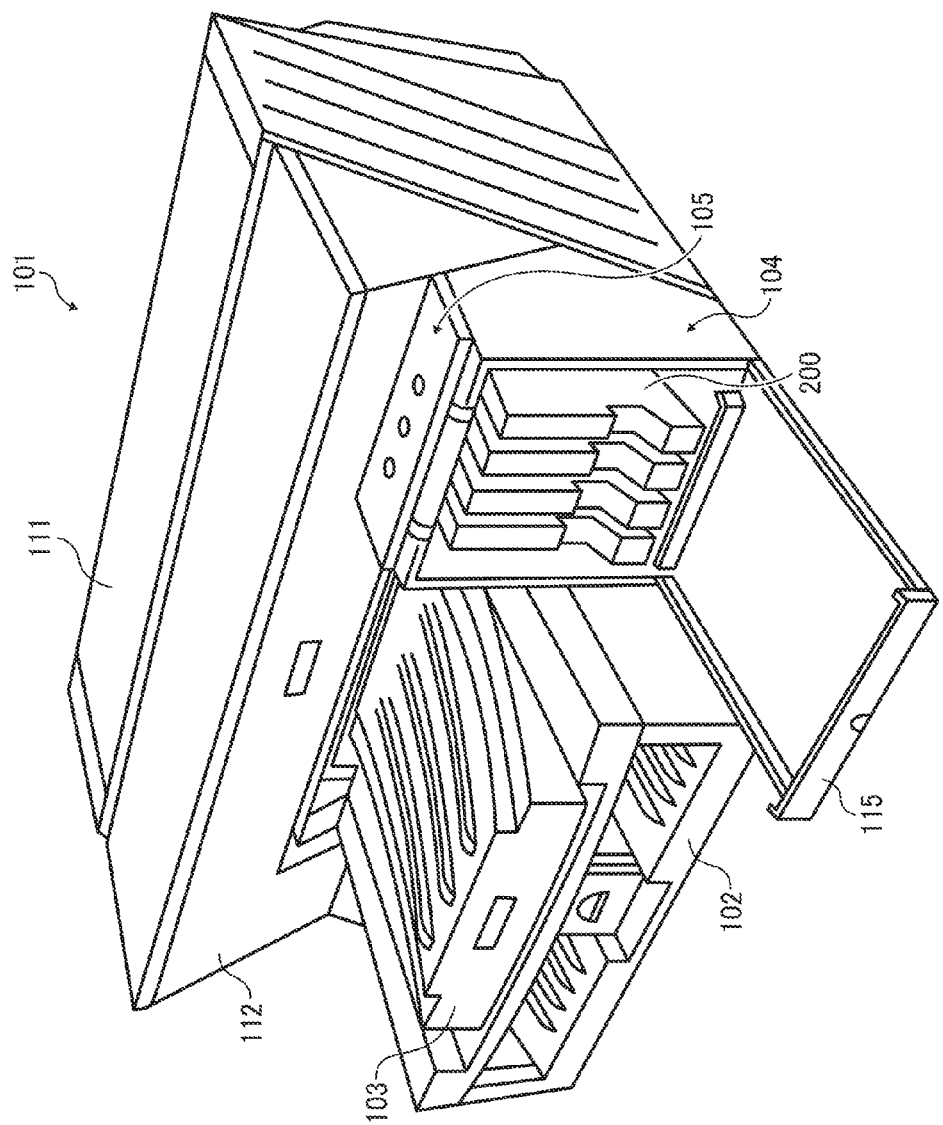
FIG. 1 is a perspective view illustrating an example of the inkjet recording device according to an embodiment of the present invention in which the cover of the ink cartridge installation unit is open.

The ink composition of the present disclosure contains a pigment, a polymer having a structure unit having a diphosphonic acid group, a hydrosoluble solvent, and water, and satisfies the following (A) and (B).

(A): The pigment is represented by the following Chemical formula 1a or Chemical formula 1b. When the pigment is represented by Chemical formula 1a, the pigment satisfies the relation 1: $Y/X \leq 0.800$, where X represents a peak intensity at a Bragg ($2\theta \pm 0.2°$) angle in a range of $2\theta$ of from $5.5°$ to $6.0°$ and Y represents a peak intensity at a Bragg ($2\theta \pm 0.2°$) angle in a range of $2\theta$ of from $26.5°$ to $27.5°$, in a CuKα X-ray diffraction spectrum having a wavelength of 1.541 Å,

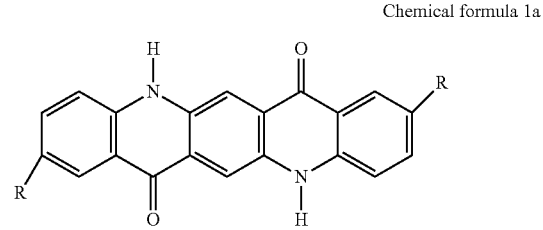

Chemical formula 1a where R each, independently represents hydrogen atoms, methyl groups, or chlorine atoms, when the pigment is represented by Chemical formula 1b, the pigment satisfies the relation 2: $Y'/X' \leq 0.200$, where $X'$ represents a peak intensity at a Bragg ($2\theta \pm 0.2°$) angle in a range of $2\theta$ of from $26.5°$ to $27.5°$ and $Y'$ represents a peak intensity at a Bragg ($2\theta \pm 0.2°$) angle in a range of $2\theta$ of from $11.0°$ to $11.5°$, in a CuKα X-ray diffraction spectrum having a wavelength of 1.541 Å,

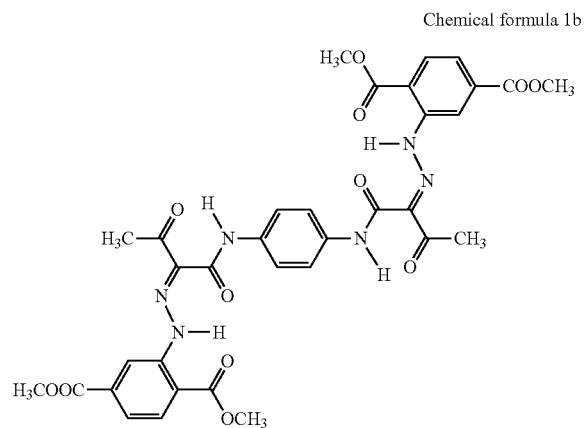

Chemical formula 1b (B) The structure unit having a diphosphonic acid group is represented by Chemical formula 2

Chemical formula 2

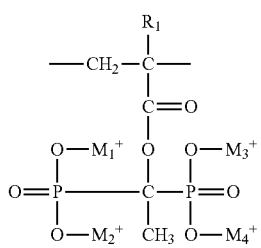

where $R_1$ represents a hydrogen atom or a methyl group and $M_1^+$, $M_2^+$, $M_3^+$, and $M_4^+$ each, independently represents alkali metal ions, organic ammonium ions, or hydrogen ions.

The ink composition, the ink cartridge, the inkjet recording device, and recorded matter of the present disclosure are described with reference to the accompanying drawings. Incidentally, it is to be noted that the following embodiments are not limiting the present disclosure and any deletion, addition, modification, change, etc. can be made within a scope in which man in the art can conceive including other embodiments, and any of which is included within the scope of the present disclosure as long as the effect and feature of the present disclosure are demonstrated.

Ink Composition

The ink composition of the present disclosure contains a pigment, a polymer having a structure unit having a diphosphonic acid group, a hydrosoluble solvent, and water, and satisfies the following (A) and (B).

(A): The pigment is represented by the following chemical formula 1a or chemical formula 1b. When the pigment is represented by Chemical formula 1a, the pigment satisfies the relation 1: $Y/X \leq 0.800$, where X represents a peak intensity at a Bragg $(2\theta \pm 0.2°)$ angle in a range of $2\theta$ of from 5.5° to 6.0° and Y represents a peak intensity at a Bragg $(2\theta \pm 0.2°)$ angle in a range of $2\theta$ of from 26.5° to 27.5°, in a CuKα X-ray diffraction spectrum having a wavelength of 1.541 Å, Chemical formula 1a

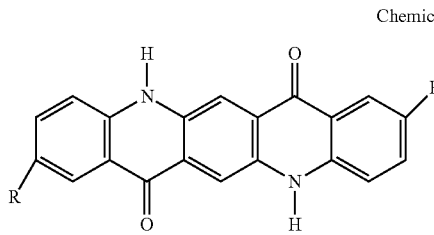

where R each, independently represents hydrogen atoms, methyl groups, or chlorine atoms, when the pigment is represented by Chemical formula 1b, the pigment satisfies the relation 2: $Y'/X' \leq 0.200$, where X' represents a peak intensity at a Bragg $(2\theta \pm 0.2°)$ angle in a range of $2\theta$ of from 26.5° to 27.5° and Y' represents a peak intensity at a Bragg $(2\theta \pm 0.2°)$ angle in a range of $2\theta$ of from 11.0° to 11.5°, in a CuKα X-ray diffraction spectrum having a wavelength of 1.541 Å, Chemical formula 1b

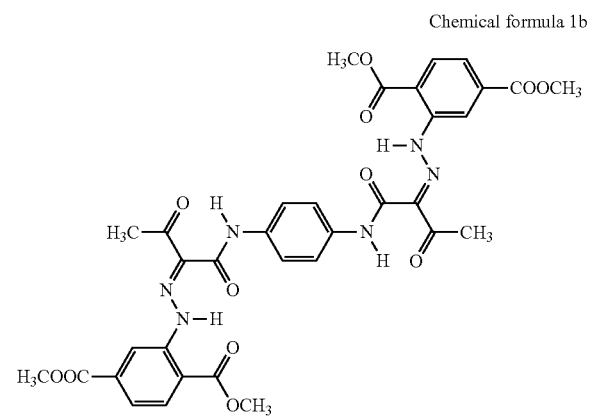

(B) the structure unit having a diphosphonic acid group is represented by Chemical formula 2.

Chemical formula 2

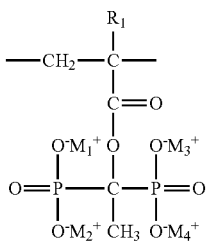

where $R_1$ represents a hydrogen atom or a methyl group and $M_1^+$, $M_2^+$, $M_3^+$, and $M_4^+$ each, independently represents alkali metal ions, organic ammonium ions, or hydrogen ions.

The present invention is described in detail below.

In the inkjet recording system, to obtain an excellent coloring image, it is thought to be preferable to fix a colorant such as a pigment on the surface of a recording medium, typically paper, and improve the coloring property of the pigment itself.

However, since widely-used plain paper for a plain paper copier (PPC) has a surface containing no material for fixing in the inkjet recording system, ink on the surface permeates inside the paper. For this reason, pigment particles present around the surface are less in number, resulting in no good coloring. Therefore, the thus-obtained image looks dull.

According to the present invention, this problem is solved by a combination of technologies of fixing a pigment on the surface of a recording medium and improvement of the coloring of the pigment itself.

With regard to the former, a pigment is dispersed by a polymer having a diphosphonic acid group, which has a high reactivity with a calcium ion, and the pigment dispersion particles are caused to react with a calcium ion disassociated from calcium carbonate widely present on the entire of the paper when the pigment dispersion pigments land on the paper. Consequently, the pigment particles agglomerate and remain on the surface, so that recording images having excellent coloring property can be produced. A diphosphonic acid group is hydrophilic but becomes hydrophobic at reaction with a multi-valent metal ion such as calcium ion, magnesium ion, and aluminum ion. For this reason, an ink composition using a polymer containing a diphosphonic acid group as a pigment dispersant is used on a recording medium containing a multi-valent metal salt, the pigment dispersant adsorbed to the pigment reacts with a multi-valent metal ion eluted from the recording medium and becomes hydrophobic, resulting in agglomeration of the pigment. As a result, permeation of the pigment into paper is subdued, which leads to excellent coloring.

As the latter case, by decreasing the crystallinity of a pigment having the structure represented by Chemical formula 1a or Chemical formula 1b while maintaining the crystal structure of the pigment in order not to degrade light resistance or gas resistance, coloring on a par with that of a dye is demonstrated, thereby to output a recording image having excellent coloring. A polymer having a diphosphonic acid group is found to have a particularly good compatibility with the pigment represented by Chemical formula 1a or chemical formula 1b in a case of an ink composition containing an organic solvent. That is, the polymer has good affinity with the pigment mentioned above in ink until it contacts the multi-valent metal ion mentioned above. After the ink is discharged onto a recording medium, the polymer smoothly moves from the pigment to the multi-valent metal ion.

This makes it possible to provide an ink composition that demonstrates an image having excellent coloring irrespective of the kind of paper.

Pigment

In the present disclosure, the material represented by Chemical formula 1a or Chemical formula 1b is used as a pigment. The pigment represented by Chemical formula 1a is included in quinacridone-based pigments and the pigment represented by Chemical formula 1b is included in C. I. Pigment Yellow 155.

Specific examples of the pigments represented by Chemical formula 1a include, but are not limited to, the following. C.I. Pigment Violet 19 represented by the following chemical formula 1a-1, C.I. Pigment Red 122 represented by the following chemical formula 1a-2, and C.I. Pigment Red 202 represented by the following chemical formula 1a-3.

Chemical formula 1a-1

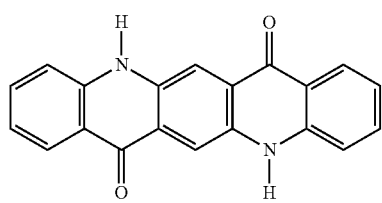

Chemical formula 1a-2

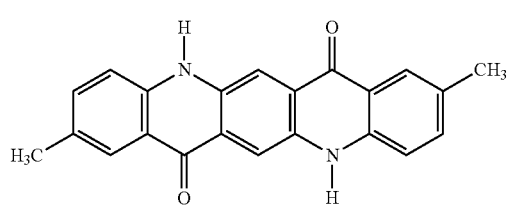

Chemical formula 1a-3

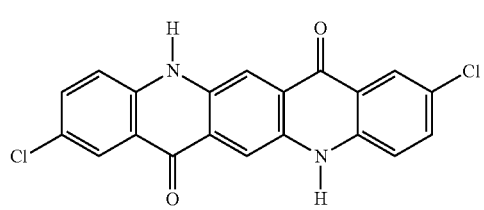

To obtain an ink composition satisfying the relation 1: $Y/X \leq 0.800$ or the relation 2: $Y'/X' \leq 0.200$, the size of the crystal of a pigment has to be relatively small in comparison with a conventional pigment to decrease the crystallinity thereof. Such ink compositions can be manufactured by a microreactor to precipitate dissolved pigment in minute reaction fields in the following manner.

"reducing the crystallinity" while maintaining the crystalline structure of a pigment means reducing an n-th (n>1) peak intensity relatively to the first peak intensity in an X-ray diffraction spectrum.

With regard to the pigment represented by Chemical formula 1a, it is required to reduce the peak intensity Y at a diffraction angle 2θ of from 26.5° to 27.5° against the intensity X of the first peak at a diffraction angle 2θ of from 5.5° to 6.0°. Coloring property is improved by satisfying the relation: $Y/X \leq 0.800$. In addition, the ratio Y/X is preferably $0.000 \leq Y/X \leq 0.600$. Moreover, coloring property is improved if no peak is observed at a diffraction angle 2θ of from 28.0° to 29.0°.

The "peak" in the present disclosure is determined as a peak having a maximum width of 0.5° or greater in a graph of smoothed data and a single local maximal value.

To be specific, after smoothing processing to remove noises from X-ray diffraction intensity data, a smoothing filter by a moving-average method is used if the data were digital.

The five sets of data including the calculation target data, two sets of data therebefore, and two sets of data thereafter were averaged to replace the calculation target data with the smoothing filter. If the data are analogue, the smoothing processing is conducted by drawing a smooth curve that passes through the average of the noises.

Thereafter, a straight base line having a length of 0.5° or greater in the X axis direction is drawn in such a manner that only one peak is present on the smoothed data in the range sandwiched by both ends of the base line. If a base line satisfying this condition is drawn and a peak is present within a range of 2θ of from 28.0° to 29.0°, it is determined that there is a peak. In other cases, it is determined that there is no peak.

As for the pigment represented by Chemical formula 1b, it is required to reduce the peak intensity Y' at a diffraction angle 2θ of from 11.0° to 11.5° against the intensity X' of the first peak at a diffraction angle 2θ of from 26.5° to 27.5°. Coloring property is improved by satisfying the relation: $Y'/X' \leq 0.200$. The relation is preferably $0.000 < Y'/X' < 0.140$.

A method of reducing crystallinity while maintaining the crystalline structure of such a pigment includes, for example, temporarily dissolving the pigment in an acid or a solvent and charging the thus-obtained solution into a poor solvent for re-crystallization. In such a method, to prevent the crystal of a pigment from growing excessively, the pigment is quickly precipitated in a small reaction field. Incidentally, conventionally a solution of a pigment is dripped to a poor solvent while being stirred. In such a conventional method, the size of a reaction field for precipitation is about 1 cm or greater and the stirring speed is limited, so that large crystals are formed. As a consequence, pigment particles having a reduced crystallinity are not formed.

However, a microreactor to precipitate dissolved pigments in minute reaction fields was developed recently, which makes it possible to precipitate pigment particles in minute reaction fields at a high speed while suppressing the growth of crystals. In general, a microreactor is a flow-type reaction device to conduct chemical reaction or mixing and precipitation for material production in a micro space having a size about 1 mm or less per side. Specific examples thereof include, but are not limited to, mikroSyn (manufactured by SIBATA SCIENTIFIC TECHNOLOGY LTD.) having minute plumbing of from 50 μm to 500 μm as a reaction field, MiChS System (manufactured by MiChS Co., Ltd.), and ULREA (manufactured by M Technique Co. Ltd.) utilizing a forced ultra thin layer formed of gaps of from 1 μm to 30 μm between two rotatable discs as a reaction field.

In general, the efficiency of chemical reaction depends on the collision frequency between molecules and energy applied to a system. Since the transfer distance of molecules and heat is short in a micro space, increasing the collision frequency of molecules and quick heat transfer are possible, which enables quick mixing, quick precipitation, quick heat exchange, and quick diffusion. Therefore, to form a pigment having a reduced crystallinity while maintaining the crystalline structure of the pigment, the size of the reaction field is preferably 100 μm or less and more preferably 30 μm or less.

To dissolve a pigment represented by Chemical formula 1a or Chemical formula 1b, it is possible to use an acid or an organic solvent.

A strong acid such as strong sulfuric acid, hydrochloric acid, and nitric acid can be used as the acid. Strong sulfuric acid is particularly desirable in terms of solubility and dissolves the pigment represented by Chemical formula 1a or Chemical formula 1b at a concentration of from 3% by weight to 5% by weight.

Specific examples of the organic solvent include, but are not limited to, dimethyl sulfoxide, 1-methyl-2-pyrrolidinone, 1,3-dimethyl-2-imidazolidinone, N.N-dimethyl formamide, and N,N-dimethyl acetamide. Of these, dimethyl sulfoxide is suitable in particular. However, since the pigment represented by Chemical formula 1a or Chemical formula 1b has a solubility of less than 1% by weight at room temperature and normal pressure, it is preferable to use strong sulfuric acid to dissolve the pigment represented by Chemical formula 1a or Chemical formula 1b. The temperature of a pigment solution can be raised to the temperature as high as the boiling point of the dissolved acid or organic solvent to increase the solubility.

Specific examples of the poor solvent include, but are not limited to, water, methanol, ethanol, isopropanol, or liquid mixtures in which methanol, ethanol, and/or isopropanol is dissolved in water. If simple water or a liquid mixture of water with the alcohol mentioned above is cooled down to −20° C. to −50° C., the poor solvent may coagulate. Considering that the reaction is fast when the temperature difference between the pigment solution and the solvent is large, it is preferable to use methanol, ethanol, or isopropanol that contains no water because the temperatures can be lowered.

The size and the crystallinity of pigment particles formed using a microreactor depend on the ratio of the flow rate of a pigment solution to the flow rate of a poor solvent. The ratio of the flow rate (mL/minute) of the pigment solution to the flow rate (mL/minute) of the poor solvent is preferably from 0.005 to 0.5 and more preferably from 0.01 to 0.1. When the ratio is small, the reaction speed is high, meaning that the crystallinity of the pigment can be lowered. When the ratio is 0.5 or less, pigment particles having low cyrstallinity can be formed. By contrast, when the ratio is 0.005 or greater, removing a solvent from pigment particles and thereafter collecting the pigment particles becomes easy.

Pigment particles that are dispersed in a liquid mixture of an acid and a poor solvent formed by a microreactor according to the methods described above are retrieved as a pigment paste after removing the acid and the solvent using a centrifugal followed by washing with deionized water several times.

The pigment dispersed in the ink composition of the present disclosure preferably has a particle diameter of from 30 nm to 100 nm and more preferably from 60 nm to 120 nm To control the pigment particle diameter to be within this range, it is possible to use, for example, a mixing and kneading and dispersing machine using balls such as a bead mill or a ball mill, a mixing and kneading and dispersing machine using a shearing force such as a roll mill, or an ultrasonic wave dispersion machine. Of these, an ultrasonic wave dispersion machine is suitable for the present disclosure.

When the pigment particle diameter is 30 nm or greater, the light resistance of the pigment is improved, thereby reducing the change in color. This is advantageous of using a pigment. In addition, when the pigment particle diameter is 100 nm or less, image gloss becomes high. Therefore, it is possible to produce images with good saturation and brightness.

The concentration of the pigment in an ink is preferably from 1% by weight to 15° A by weight, more preferably from 2% by weight to 12% by weight, and furthermore preferably from 3% by weight to 9% by weight. When the pigment density is 1% by weight or greater, sufficient coloring power can be obtained and a high saturation and a high image density can be obtained.

In addition, when the pigment concentration is 15% by weight or less, an obtained ink composition is stable for a long period of time because the ink is stabilized.

Polymer Having Structure Unit Having Diphosphonic Acid Group

The ink composition of the present disclosure has a polymer having a structure unit having a diphosphonic acid group.

The polymer can be obtained by addition polymerization or condensation polymerization but a copolymer is particularly preferable. When a copolymer is used, an ink is obtained which has excellent coloring, storage stability, and discharging stability.

The polymer for use in the present disclosure is obtained by reacting a monomer of Chemical formula 2 having a diphosphonic acid group and another optional monomer with a solvent placed in a flask equipped with a stirrer, a thermometer, and a nitrogen gas introducing tube under the presence of a polymerization initiator in nitrogen gas reflux at about 50° C. to about 150° C. The viscosity of the aqueous solution or a water liquid dispersion of the synthesized polymer is adjusted by changing the molecular weight thereof.

Specifically, monomer concentration during polymerization, the amount of a polymerization initiator, polymerization temperature, and polymerization time are changed.

With regard to the polymerization temperature, a polymer having a low molecular weight is easily obtained by polymerization at high temperatures for a short period of time. By contrast, a polymer having a high molecular weight tends to be obtained by polymerization at low temperatures for a long period of time.

With regard to the amount of a polymerization initiator, if a large amount thereof is used, a polymer having a low molecular weight tends to be obtained. If the amount is small, a polymer having a high molecular weight tends to be obtained. The polymerization initiator has no particular limit and can be any known polymerization initiator.

With regard to the monomer concentration during polymerization reaction, if the concentration is high, a polymer having a low molecular weight tends to be obtained. If the concentration is low, a polymer having a high molecular weight tends to be obtained.

There is no specific limit to the weight average molecular weight of the polymer having a diphosphonic acid group. The weight average molecular weight is appropriately selected to a particular application. It is preferably from 3,000 to 60,000, more preferably from 4,000 to 50,000, and furthermore preferably from 5,000 to 30,000. When the weight average molecular weight is within the preferable range, if the polymer is used for an ink composition for inkjet recording, the dispersion stability and discharging stability of the ink composition are improved.

The weight average molecular weight can be measured by, for example, gel permeation chromatography (GPC).

The polymer having a structure unit having a diphosphonic acid group includes the structure unit represented by Chemical formula 2. Chemical formula 2 is illustrated below again.

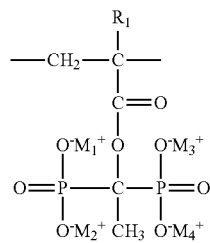

Chemical formula 2

In Chemical formula 2, $R_1$ represents a hydrogen atom or a methyl group and $M_1^+$, $M_2^+$, $M_3^+$, and $M_4^+$ each, independently represents alkali metal ions, organic ammonium ions, or hydrogen ions.

Specific examples of the alkali metal of "$M_1^+$ to $M_4^+$" in the chemical formula 2 include, but are not limited to, lithium, sodium, and potassium. Of these, potassium ion is preferable in terms of balance between image density and storage stability.

In the organic ammonium ion, one or more hydrogen atoms are substituted with an organic material in an ammonium ion. A specific example is an organic amine.

Specific examples of the organic amines of "$M_1^+$ to $M_4^+$" in Chemical formula 2 include, but are not limited to, alkyl amines such as mono-, di- or tri-methyl amine, mono-, di-, or tri-ethyl amine; alcohol amines such as ethanol amine, diethanol amine, triethanol amine, methyl ethanol amine, methyl diethanol amine, dimethyl ethanol amine, monopropanol amine, dipropanol amine, tripropanol amine, isopropanol amine, trishydroxy methyl amino methane, and 2-amino-2-ethyl-1,3-propane diol (AEPD); and cyclic amines such as choline, morpholine, N-methyl morpholine, N-methyl-2-pyrolidone, and 2-pyrolidone.

It is preferable that a half or more or the entire of $M_1^+$ to $M_4^+$ are alkali metal ions or organic ammonium ions and the rest are hydrogen ions (proton).

Moreover, $R_1$ in Chemical formula 2 is preferably a methyl group.

Specific examples of the compounds represented by Chemical formula 2 include, but are not limited to, 1-methacryloxy ethane-1,1-diphosphonic acid represented by Chemical formula 2-1 in which $R_1$ is a methyl group and 1-acryloxy ethane-1,1-diphosphonic acid represented by Chemical formula 2-2 in which $R_1$ is a hydrogen atom.

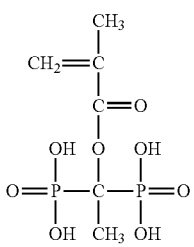

Chemical formula 2-1

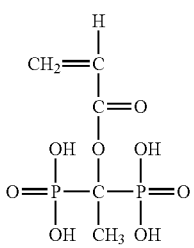

Chemical formula 2-2

In addition, it is preferable that the polymer having the structure unit having a diphosphonic acid group is represented by Chemical formula 3 or Chemical formula 4. Chemical formula 3 is illustrated below.

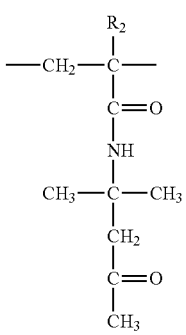

Chemical formula 3

In Chemical formula 3, $R_2$ represents a hydrogen atom or a methyl group.

Specific examples of the compounds represented by Chemical formula 3 include, but are not limited to, diacetone methacryl amide represented by Chemical formula 3-1 in which $R_2$ is a methyl group and diacetone acryl amide represented by Chemical formula 3-2 in which $R_2$ is a hydrogen atom.

Chemical formula 3-1

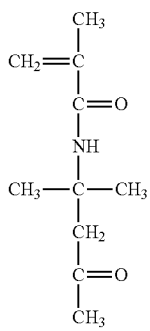

Chemical formula 3-2

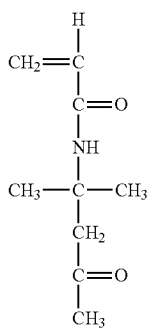

Next, Chemical formula 4 is illustrated below.

Chemical formula 4

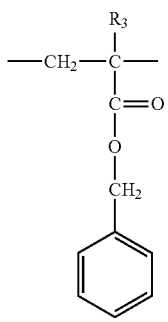

In Chemical formula 4, $R_3$ represents a hydrogen atom or a methyl group.

Specific examples of the compounds represented by Chemical formula 4 include, but are not limited to, benzyl methacrylate represented by Chemical formula 4-1 in which $R_3$ is a methyl group and benzyl acrylate represented by Chemical formula 4-2 in which $R_3$ is a hydrogen atom, Chemical formula 4-1

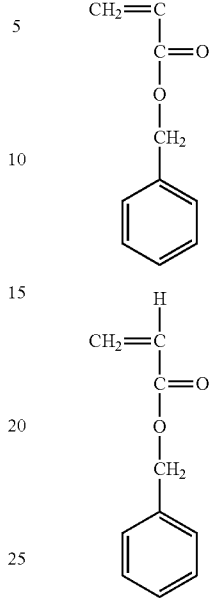

Chemical formula 4-2

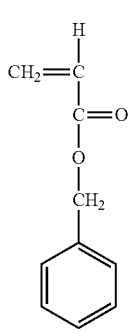

The polymer having a structure unit having a diphosphonic acid group includes the structure unit represented by Chemical formula 2 and optionally has a structure unit other than the structure unit represented by Chemical formula 3 or Chemical formula 4. Of these, it is preferable to include the structure units derived from polymerizable monomers such as 2-methacryloyloxy ethyl phosphorylcholine represented by Chemical formula 5, glycerin monometacrylate represented by Chemical formula 6, stearyl acrylate represented by Chemical formula 7, 1-vinylnaphtalene represented by Chemical formula 8, and acrylic acid oleyl represented by Chemical formula 9.

Chemical formula 5

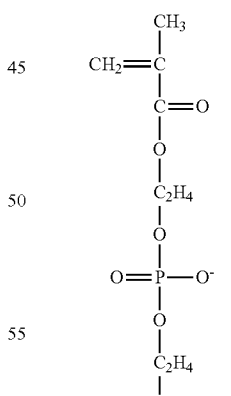

Chemical formula 6

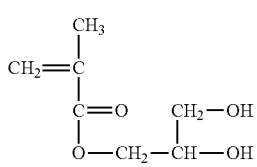

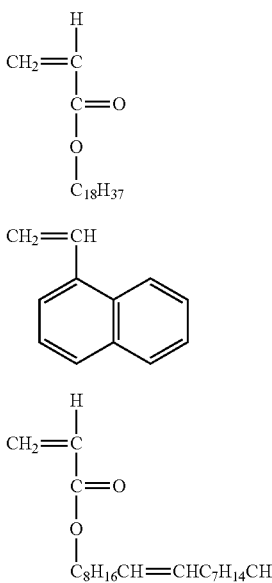

Chemical formula 7

Chemical formula 8

Chemical formula 9

There is no specific limit to the other usable polymerizable monomers. These can be selected to particular application. Examples are polymerizable hydrophobic monomers and polymerizable hydrophilic monomers.

There is no specific limit to the polymerizable hydrophobic monomer, which can be suitably selected to a particular application. Specific examples of the polymerizable hydrophobic monomer include, but are not limited to, unsaturated ethylene monomers having aromatic rings such as α-methyl styrene, 4-t-butyl styrene, and 4-chloromethyl styrene; alkyl (meth)acrylates such as methyl (meth)acrylate, ethyl (meth)acrylate, n-butyl (meth)acrylate, dimethyl maleate, dimethyl itaconate, dimethyl fumarate, lauryl (meth)acrylate (C12), tridecyl (meth)acrylate (C13), tetradecyl (meth)acrylate (C14), pentadecyl (meth)acrylate (C15), hexadecyl (meth)acrylate (C16), heptadecyl (meth)acrylate (C17), nonadecyl (meth)acrylate (C19), eicosyl (meth)acrylate (C20), henicosyl (meth)acrylate (C21), and docosyl (meth)acrylate (C22); and unsaturated ethylene monomers having alkyl groups such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and 1-docosene.

There is no specific limit to the polymerizable hydrophilic monomer and any of them can be suitably selected to a particular application. Specific examples of the polymerizable hydrophilic monomer include, but are not limited to anionic unsaturated ethylene monomers such as (meth)acrylic acid or salts thereof, maleic acid or salts thereof, monomethyl maleate, itaconic acid, monomethyl itaconate, fumaric acid, 4-styrenesulfonic acid, and 2-acrylamide-2-methylpropanesulfonic acid; and nonionic unsaturated ethylene monomers such as 2-hydroxyethyl (meth)acrylate, diethylene glycol mono(meth)acrylate, triethylene glycol mono(meth)acrylate, tetraethylene glycol mono(meth)acrylate, polyethylene glycol mono(meth)acrylate, (meth)acrylamide, N-methylol(meth)acrylamide, N-vinylformamide, N-vinylacetamide, N-vinylpyrrolidone, acrylamide, N,N-dimethylacrylamide, N-t-butylacrylamide, N-octylacrylamide, and N-t-octylacrylamide.

In addition, there is no specific limit to the weight ratio of the structure unit represented by Chemical formula 2 and it can be suitably determined to a particular application. The content ratio is preferably from 5% by weight to 80% by weight, more preferably from 10% by weight to 60% by weight, and furthermore preferably from 30% by weight to 50% by weight to the total amount of the polymer mentioned above.

When the weight ratio is within the preferable range, an ink is obtained which has excellent image density, dispersion stability, and storage stability.

The weight ratio of the structure unit represented by Chemical formula 3 or Chemical formula 4 in the polymer having a structure unit having a diphosphonic acid group is set by the remaining ratio determined after setting the weight ratio of the structure unit represented by Chemical formula 2. The ratio is preferably from 5 percent by weight to 90 percent by weight and more preferably from 10 percent by weight to 80 percent by weight. Within the preferable range, image density and storage stability of inkjet ink for plain paper can be balanced.

Incidentally, the weight ratio of the structure unit represented by Chemical formula 2 in the polymer is determined by the constitution ratio of Chemical formula 3, Chemical formula 4, etc. in the polymer and set in a range of from 5% by weight to 90% by weight.

A dispersion element can be prepared by dissolving the polymer mentioned above in an aqueous medium, adding the pigment to the solution followed by sufficient moistening, and mixing and kneading and dispersing the resultant by high speed stirring by a homogenizer, a disperser using balls such as a bead mill and a ball mill, a mixing and kneading disperser using a shearing force such as a roll mill, or an ultrasonic disperser. However, after such a dispersion process, coarse particles are contained in most cases, which causes clogging in the inkjet nozzle or the supplying route. Therefore, it is suitable to remove such coarse particles having a particle diameter of 1 μm or greater by a filter or a centrifugal.

In the present disclosure, it is preferable to use the polymer in an amount of from 10% by weight to 100% by weight and, more preferable, from 20% by weight to 50% by weight to a pigment. When the content of the polymer to a pigment is 10% by weight or greater, the pigment can be finely dispersed. When the content of the polymer to a pigment is 100% by weight or less, the polymer is appropriately attached to the surface of the pigment, the storage of ink is improved and image free from image blur can be produced.

In addition, the content of the dispersed particulate in ink is preferably from about 2% by weight to about 20% by weight and more preferably from 3% by weight to 15% by weight as the solid portion of the total of the pigment and the polymer.

Hydrosoluble Solvent

The ink of the present disclosure is prepared by using water as a liquid medium. To prevent the ink from drying, improve the dispersion stability, and prevent curling of plain paper, the following hydrosoluble solvents are used. These hydrosoluble solvents can be used in combination.

Specific examples thereof include, but are not limited to the following:

Polyols such as glycerin, ethylene glycol, diethylene glycol, isopropylidene glycerol, 1,3-butane diol, 3-methyl- 1,3-butane diol, triethylene glycol, propylene glycol, dipropylene glycol, trimethylol propane, trimethylol ethane, ethyene glycol, diethylene glycol, dipropylene glycol, tripropylene glycol, tetraethylene glycol, hexylene glycol, polyethylene glycol, polypropylene glycol, 1,5-pentane diol, 1,6-hexane diol, glycerol, 1,2,6-hexane triol, 1,2,4-butane diol, 1,2,3-butane triol, and petriol;

Polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether;

Polyol aryl ethers such as ethylene glycol monophenyl ether and ethylene glycol monobenzyl ether;

Nitrogen-containing heterocyclic compounds such as 2-pyrolidone, N-methyl-2-pyrolidone, N-hydroxyethyl-2-pyrolidone, 1,3-dimethylimidazoline, ϵ-caprolactam, and γ-butylolactone;

Amides such as formamide, N-methyl formamide, N,N-dimethyl formamide, N,N-dimethyl-β-methoxy propion amide, and N,N-dimethyl-β-buthoxy propion amide;

Amines such as monoethanol amine, diethanol amine, triethanol amine, monoethyl amine, diethylamine, and triethyl amine; Sulfur-containing compounds such as dimethyl sulfoxide, sulfolane, and thiodiethanol;

3-ethyl-3-hydroxymethyl oxetane, propylene carbonate, and ethylene carbonate.

Of these hydrosoluble solvents, 3-ethyl-3-hydroxymethyl oxetane, isopropylidene glycerol, N,N-dimethyl-β-methoxy propion amide, and N,N-dimethyl-β-buthoxy propion amide are particularly preferable. These are excellent to prevent curling of plain paper.

Sugar groups can be also contained as a hydrosoluble solvent in the present disclosure. Specific examples of the sugar groups include, but are not limited to, monosaccharides, disaccharides, oligosaccharides (including triaccharides and tetrasaccharides), and polysaccharides. Specific examples thereof include, but are not limited to, glucose, mannose, fructose, ribose, xylose, arabinose, galactose, maltose, cellobiose, lactose, saccharose, trehalose, and maltotriose. Polysaccharides represent sugar in a broad sense and are materials that are present widely in nature, for example, α-cyclodextrine and cellulose.

Specific examples of derivatives of these sugar groups include, but are not limited to, reducing sugars, oxidized sugars, amino acid, and thio acid for the sugar groups specified above. Sugar alcohols are particularly preferable and specific examples thereof include, but are not limited to, maltitol and sorbit.

The blend ratio of the pigment and the hydrosoluble solvent has a large impact on the discharging stability of ink discharged from a head. If the blending amount of the hydrosoluble agent is small while the content of the solid pigment portion is large, water evaporation around ink meniscus of nozzles tends to be accelerated, resulting in poor discharging performance. The blending ratio of the hydrosoluble solvent is preferably from 10% by weight to 70% by weight and more preferably from 20% by weight to 50% by weight based on the entire of ink. The ink having such a content ratio is extremely good about the test for drying, preservation, and reliability.

Other Materials

Known additives such as permeating (penetrating) agents, pH regujlators, preservatives and fungicides, corrosion inhibitors, anti-oxidants, ultraviolet absorbents, oxygen absorbents, light stabilizers, and anti-kogation agents can be optionally added to the ink composition of the present disclosure.

Permeating Agent

By adding a permeating agent to an ink, the surface tension is lowered so that the ink filling property of the ink to the nozzles and the discharging stability ameliorate. In addition, since the ink droplets quickly permeate into a recording medium after the ink droplets have landed thereon, feathering and color bleed are reduced. Surfactants and solvents having a penetrating property are used as the permeating agent.

The surfactants are classified into anionic surfactants, nonionic surfactants, and ampholytic surfactants by hydrophilic group or fluorine-based surfactants, acetylene-based surfactants, etc. by hydrophobic group.

Specific examples of the anionic surfactants include, but are not limited to, polyoxyethylene alkyl ether acetates, dodecyl benzene sulfonates, laurates, and polyoxyethylene alkyl ether sulfates.

Specific examples of the nonionic surfactants include, but are not limited to, polyols, glycol ethers, polyoxyethylene alkyl ethers, polyoxyethylene alkyl esters, polyoxy ethylene sorbitan aliphatic esters, polyoxyethylene alkyl phenyl ethers, polyoxyethylene alkyl amines, polyoxyethylene alkyl amides, and acetylene glycol.

Specific examples of the fluorine-based surfactants include, but are not limited to, perfluoroalkyl sulfonic acid salts, perfluoroalkyl carboxylic acid salts, perfluoroalkyl phosphoric acid esters, adducts of perfluoroalkyl ethylene oxide, perfluoro alkyl betaine, perfluoro alkyl amine oxide, and perfluoro alkyl ether compounds. Of these, the fluorine-containing surfactant (UNIDYNE DSN-403N, manufactured by DAIKIN INDUSTRIES, ltd.) represented by Chemical formula 10 is particularly preferably used.

Chemical formula 10

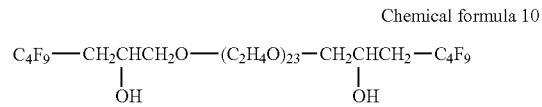

Specific examples of the acetylene glycol-based surfactants include, but are not limited to, acetylene glycols such as 2,4,7,9-tetramethyl-5-desine-4,7-diol, 3,6-dimethyl-4-octine-3,6-diol, and 3,5-dimethyl-1-hexine-3-ol {(for example, SURFYNOL® 104, 82, 465, 485, and TG, manufactured by AIR PRODUCTS and CHEMICALS, INC. (US)}. Of these, SURFYNOL® 104, 465, and TG are particularly good to demonstrate good printing quality.

Specific examples of the solvents having a penetrating property include, but are not limited to, polyols having eight or more carbon atoms such as 2-ethyl-1,3-hexane diol, and 2,2,4-trimethyl-1,3-pentane diol and glycol ethers.

These surfactants may be used alone or in combination. In the present disclosure, it is preferable to use the permeating agent in an amount of from 0.01% by weight to 5% weight and, more preferable, from 0.03% weight to 2% weight based on the entire ink.

When the amount of the surfactant is 0.01% by weight or greater, dots sufficiently spread after printing, thereby covering the entire of an image with the dots. As a result, image density and saturation are maintained high. When the amount of the surfactant is 5% by weight or less, foaming is subdued so that flow paths in nozzles are not clogged by foams. Consequently, ink droplets are successfully discharged.

pH Regulator

The pH regulator is added to maintain the ink in the state of alkali, thereby stabilizing the dispersion state and ink discharging. However, when the pH is too high, the head of inkjet and an ink supplying unit tends to be dissolved easily, which results in modification, leakage, bad discharging performance of the ink, etc. It is more desirable to add a pH regulator when the pigment is mixed and kneaded and dispersed in water together with a dispersant than when additives such as a hydrosoluble solvent and a penetrating agent are added after mixing, kneading, and dispersing. This is because the pH regulator may disrupt the dispersion.

The pH regulator is preferable to contain at least one of an alcohol amine, an alkali metal hydroxide, an ammonium hydroxide, a phosphonium hydroxide, and an alkali metal carbonate.

Specific examples of alcohol amines include, but are not limited to, diethanol amine, triethanol amine, and 2-amino-2-ethyl-1,3-propane diol. Specific examples of the alkali metal hydroxides include, but are not limited to, lithium hydroxide, sodium hydroxide, and potassium hydroxide. Specific examples of the ammonium hydroxides include, but are not limited to, ammonium hydroxide, quaternary ammonium hydroxide, and quaternary phosphonium hydroxide. Specific examples of the alkali metal carbonates include, but are not limited to, lithium carbonate, sodium carbonate, and potassium carbonate.

Preservatives and Fungicides

Specific examples of the preservatives and fungicides include, but are not limited to, dehydrosodium acetate, sodium sorbinate, 2-pyridine thiol-1-oxide sodium, sodium benzoate, and pentachlorophenol sodium.

Corrosion Inhibitor

Specific examples of the corrosion inhibitors include, but are not limited to, acid sulfite, thiosodium sulfate, ammonium thiodiglycolate, diisopropyl ammonium nitrite, pentaerythritol quaternary nitride, and dicyclohexyl ammonium nitrite.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Ultraviolet Absorbent

Specific examples of the ultraviolet absorbents include, but are not limited to, benzophenone-based ultraviolet absorbents, benzotriazole-based ultraviolet absorbents, salicate-based ultraviolet absorbents, cyanoacrylate-based ultraviolet absorbents, and nickel complex salt-based ultraviolet absorbents.

Anti-Kogation Agent

The ink composition of the present disclosure optionally contains an anti-kogation agent.

Kogation is a problematic phenomenon occurring to a thermal head that discharges ink (recording liquid) by utilizing a force of foaming of the ink caused by instant heating upon application of an electric current in a heater. That is, the ink composition is modified by heating, which adheres to a heater. If kogation occurs, the heater cannot conduct heating properly. Consequently, the recording fluid discharging weakens, thereby failing to discharge the recording fluid at the worst. Therefore, an anti-kogation agent is added to the recording fluid of the present disclosure to prevent kogation.

Specific examples of the anti-kogation agents include, but are not limited to, polyphosphoric acid, polyamino carboxylic acid, aldonic acid, hydroxy carboxylic acid, polyol phosphoric acid esters, and salts thereof, acids having an amino group and salts thereof, and ammonium salts of acids having a methyl group, a methylene group, and a carboxyl group.

Water

Specific examples of water for use in the present disclosure include, but are not limited to, pure water such as deionozed water, ultrafiltrated water, mill-Q water, and distilled water or ultrapure water. The content of water is preferably from 20% by weight to 80% by weight to the total amount of ink.

Inkjet Recording Device

The ink composition of the present disclosure can be suitably applied to recording systems employing an inkjet recording system such as printers, facsimile machines, photocopiers, multi-functional machines (serving as a printer, a facsimile machine, and a photocopier) for inkjet recording.

The inkjet recording device of the present disclosure includes a container (e.g., ink container) to accommodate the ink composition of the present disclosure and a recording head to discharge the ink composition supplied from the ink container.

Inkjet recording devices, which were used in Examples, are described below.

An inkjet recording device 101 illustrated in FIG. 1 has a sheet feeder tray 102 to accommodate recording media placed therein, a discharging tray 103 installed in the inkjet recording device 101, which stores recording media on which images are recorded (formed), and an ink cartridge inserting unit 104. On the upper surface of the ink cartridge installation unit 104 is arranged an operating portion 105 including operation keys, a display, etc. The ink cartridge inserting portion 104 has a front cover 115 that is openable and closable to detach and attach an ink cartridge 200. The reference numeral 111 represents an upper cover and, 112, the front surface of the front cover.

Figure 2:
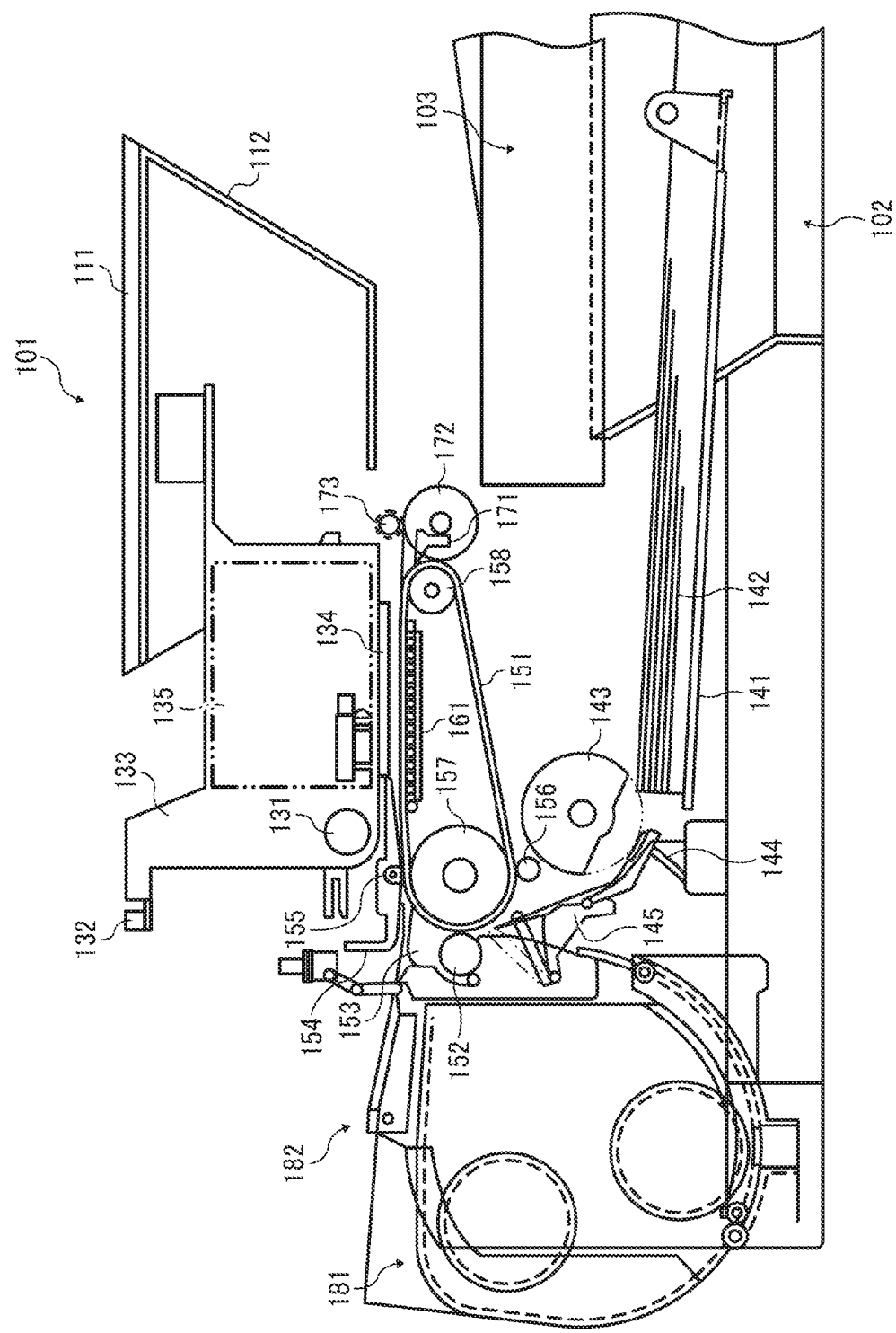
FIG. 2 is a schematic diagram illustrating the entire configuration of the inkjet recording device according to an embodiment of the present invention.

Inside the inkjet recording device 101, as illustrated in FIG. 2, a guide rod 131 and a stay 132 serving as guiding members that are laterally bridged from the right side to the left side hold a carriage 133 slidably movable in the main scanning direction. A main scanning motor moves the carriage 133 for scanning.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has sub tanks 135 for each color to supply each color ink to the recording head 134. The ink is supplied and replenished to the sub-tank 135 from the ink cartridge 200 of the present disclosure mounted onto the ink cartridge installation unit 104 via an ink supplying tube.

A sheet feeding unit to feed a sheet 142 loaded on a sheet loader (pressure plate) 141 of the sheet feeder tray 102 includes a half-moon shape roller (sheet feeding roller 143) to separate and feed the sheet 142 one by one from the sheet loader 141 and a separation pad 144 that is made of a material having a large friction index and arranged facing the sheet feeding roller 143 while biased towards the sheet feeding roller 143.

A transfer unit to transfer the sheet 142 fed from the sheet feeding unit on the lower side of the recording head 134 includes a transfer belt 151 to electrostatically adsorb and transfer the sheet 142, a counter roller 152 to transfer the sheet 142 fed from the sheet feeding unit via a guide 145 while pinching the sheet 142 with the transfer belt 151, a transfer guide 153 to make the sheet 142 track on the transfer belt 151 by changing the transfer direction of the sheet 142 being sent substantially vertically upward by substantially 90°, a front end pressure roller 155 biased towards the transfer belt 151 by a pressing member 154, and a charging roller 156 to charge the surface of the transfer belt 151.

The transfer belt 151 is an endless form belt, stretched between a transfer roller 157 and a tension roller 158 and rotatable in the belt transfer direction. This transfer belt 151 includes, for example, a top layer serving as a sheet adsorption surface made of a resin material such as a copolymer (ETFE) of tetrafluoroethylene and ethylene with no resistance control treatment having a thickness about 40 μm, and a bottom layer (moderate resistance layer, earth layer) made of the same material as the top layer with resistance control treatment with carbon. On the rear side of the transfer belt 151, a guiding member 161 is arranged corresponding to the printing area by the recording head 134. A discharging unit to discharge the sheet 142 on which images are recorded by the recording head 134 includes a separation claw 171 to separate the sheet 142 from the transfer belt 151, a discharging roller 172, and a discharging roller 173. A discharging tray 103 is arranged below the discharging roller 173.

A duplex printing sheet feeding unit 181 is detachably attached to the rear side of the inkjet recording device 101.

The duplex printing sheet feeding unit 181 takes in and reverses the sheet 142 that is returned by the reverse rotation of the transfer belt 151 and feeds it again between the counter roller 152 and the transfer belt 151. A manual sheet feeding unit 182 is provided on the upper surface of the duplex printing sheet feeding unit 181.

In this inkjet recording device 101, the sheet 142 is separated and fed from the sheet feeding unit one by one substantially vertically upward, guided by the guide 145, and transferred while being pinched between the transfer belt 151 and the counter roller 152. Furthermore, the front end is guided by the transfer guide 153 and pressed against the transfer belt 151 by the front end pressure roller 155 to change the transfer direction substantially 90°.

Since the transfer belt 151 is charged by the charging roller 156 at this point in time, the sheet 142 is electrostatically adsorbed to the transfer belt 151 and transferred. By driving the recording head 134 according to the image signal while moving the carriage 133, ink droplets are discharged to the sheet 142 not in motion to record an image for an amount corresponding to one line and thereafter the sheet 142 is transferred in a predetermined amount to conduct recording for the next line. On receiving a signal indicating that the recording has completed or the rear end of the sheet 142 has reached the image recording area, the recording operation stops and the sheet 142 is discharged to the discharging tray 103.

When the amount of ink remaining in the sub-tank 135 is approaching to empty, which is detected, a predetermined amount of the ink is replenished to the sub tank 135 from the ink cartridge 200.

In this inkjet recording device, it is possible to dissemble the chassis of the ink cartridge 200 and replace the ink bag therein when the ink is used up in the ink cartridge 200. In addition, the ink cartridge 200 stably supplies the ink even when the ink cartridge 201 is placed on its side and installed by front loading. Therefore, even when the upside of the inkjet recording device 101 is blocked, for example, it is placed in a rack or something is placed on the upper surface of the inkjet recording device 101, the ink cartridge 200 is easily exchanged.

A serial type (shuttle type) in which the carriage scans is used in this description but this is true in a line-type inkjet recording device having a line type head.

Ink Cartridge

The ink cartridge of the present disclosure contains the ink composition of the present disclosure in a container and optionally other members.

There is no specific limit to the container. Any form, any structure, any size, and any material can be suitably selected. For example, a container having an ink bag formed of aluminum laminate film, a resin film, etc. can be suitably used.

Figure 3:
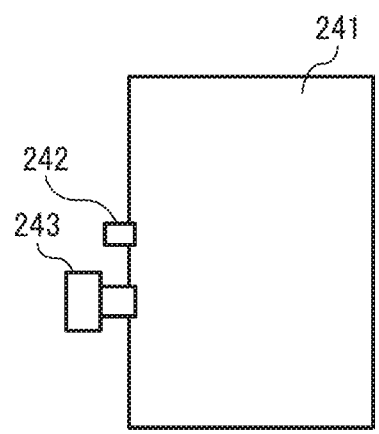
FIG. 3 is a schematic diagram illustrating an example of the ink bag of the ink cartridge according to an embodiment of the present invention.
Figure 4:
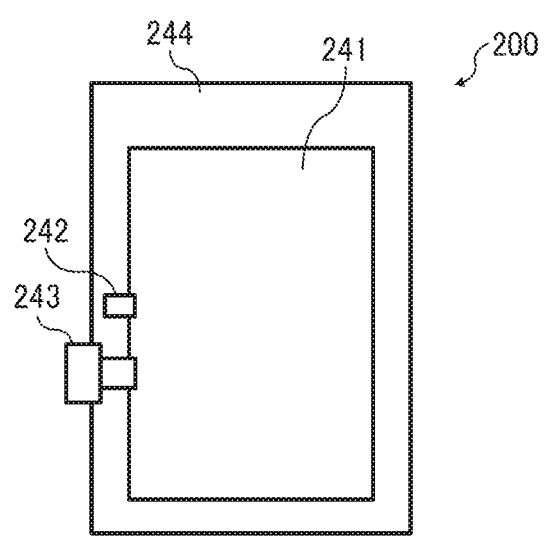
FIG. 4 is a schematic diagram illustrating an example of the ink cartridge that accommodates the ink bag illustrated in FIG. 3 in the cartridge housing.

Next, the ink cartridge is described in detail with reference to FIGS. 3 and 4. FIG. 3 is a schematic diagram illustrating an example of an ink bag 241 of the ink cartridge of the present disclosure. FIG. 4 is a schematic diagram illustrating the ink cartridge 200 that accommodates the ink bag of FIG. 3 in a cartridge housing 244.

As illustrated in FIG. 3, after the ink bag 241 is filled with ink through an ink inlet 242 and the air remaining in the ink bag 241 is discharged, the ink inlet 242 is closed by fusion. When in use, the ink is supplied by piercing the needle attached to the inkjet recording device into an ink outlet 243 made of rubber. The ink bag 241 is formed of a packaging material such as aluminum laminate film having no air permeability. The ink bag 241 is accommodated in a cartridge housing 244 made of plastic as illustrated in FIG. 4 and detachably attachable to an inkjet recording device as the ink cartridge 200.

It is particularly preferable that the ink cartridge of the present disclosure is detachably attachable to the inkjet recording device of the present disclosure.

Recorded Matter

On the recorded matter of the present disclosure, information or an image is recorded on a recording medium by using the ink composition of the present disclosure. The recorded matter of the present disclosure is manufactured by a step of conducting recording on an recording medium with ink discharged from an inkjet head.

There is no specific limit to the selection of the recording medium. For examples, plain paper, coated paper for printing, gloss paper, special paper, cloth, film, and transparent sheets can be used. These can be used alone or in combination.

Of these, at least one of plain paper and coated paper for printing is preferable. Plain paper is advantageous because it is inexpensive. Moreover, coated paper for printing is relatively inexpensive to gloss paper and advantageous to be able to print a smooth image with gloss. Plain paper and coated paper for printing are not dried well. For this reason, they are not practically suitable for inkjet printing. However, according to the ink composition of the present disclosure, the drying property of the ink composition is improved so that such recording media can be suitably used.

The recorded matter of the present disclosure is of high quality image without blur and excellent in stability over time so that it can be suitably used for various purposes such as references, on which texts, images, etc. are recorded.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Synthesis Example a

Synthesis of Polymer a 20.0. parts of the monomer represented by chemical formula 2-2 and 113.0 parts of ethanol were placed in a flask followed by stirring to obtain a uniform solution. After nitrogen was blown into this solution for 30 minutes, 1.33 parts of azobis isobutylonitrile was added thereto at 65° C. to conduct polymerization reaction for 4 hours. A viscous material obtained by removing the solvent from the thus-obtained liquid polymerization using an evaporator was added to acetone to retrieve a solid material. While diluting the thus-obtained solid material (polymer) with water, sodium hydroxide was added followed by three-day dialysis membrane refinement to achieve 100% acid neutralization. Thereafter, the concentration of the resultant was adjusted with water in such a manner that the concentration of the solid portion was 10% by weight. As a result, Polymer a was synthesized, in which the diphosphonic acid group was 100% neutralized. The weight average molecular weight of the thus-obtained Polymer a was measured by using GPC.

Synthesis Example b

Synthesis of Polymer b 8.0 parts of the monomer represented by Chemical formula 2-2, 12.0 parts of the monomer represented by Chemical formula 3-2, and 113.0 parts of ethanol were placed in a flask followed by stirring to obtain a uniform solution. After nitrogen was blown into this solution for 30 minutes, 1.33 parts of azobis isobutylonitrile was added thereto at 75° C. to conduct polymerization reaction for 3 hours. A viscous material obtained by removing the solvent from the thus-obtained liquid polymerization using an evaporator was added to acetone to retrieve a solid material. While diluting the thus-obtained Polymer b with water, sodium hydroxide was added followed by three-day dialysis membrane refinement to achieve 100% acid neutralization. Thereafter, the concentration of the resultant was adjusted with water in such a manner that the concentration of the solid portion was 10% by weight. As a result, Polymer b was synthesized, in which the diphosphonic acid group was 100% neutralized. The weight average molecular weight of the thus-obtained Polymer b was measured by using GPC.

Synthesis Example c

Synthesis of Polymer c 8.0 parts of the monomer represented by Chemical formula 2-2, 12.0 parts of the monomer represented by Chemical formula 4-2, and 113.0 parts of ethanol were placed in a flask followed by stirring to obtain a uniform solution. After nitrogen was blown into this solution for 30 minutes, 1.33 parts of azobis isobutylonitrile was added thereto at 65° C. to conduct polymerization reaction for 5 hours. A viscous material obtained by removing the solvent from the thus-obtained liquid polymerization using an evaporator was added to acetone to retrieve a solid material. While diluting the thus-obtained Polymer c with water, diethylmethyl amine was added followed by three-day dialysis membrane refinement to achieve 100% acid neutralization. Thereafter, the concentration of the resultant was adjusted with water in such a manner that the concentration of the solid portion was 10% by weight. As a result, Polymer c was synthesized, in which a diphosphonic acid group was 100% neutralized. The weight average molecular weight of the thus-obtained Polymer c was measured by using GPC.

Synthesis Example d

Synthesis of Polymer d 8.0 parts of the monomer represented by Chemical formula 2-1, 12.0 parts of the monomer represented by Chemical formula 3-2, and 113.0 parts of ethanol were placed in a flask followed by stirring to obtain a uniform solution. After nitrogen was blown into this solution for 30 minutes, 1.33 parts of azobis isobutylonitrile was added thereto at 65° C. to conduct polymerization reaction for 8 hours. A viscous material obtained by removing the solvent from the thus-obtained liquid polymerization using an evaporator was added to acetone to retrieve a solid material. While diluting the thus-obtained Polymer d with water, potassium hydroxide was added followed by three-day dialysis membrane refinement to achieve 100% acid neutralization. Thereafter, the concentration of the resultant was adjusted with water in such a manner that the concentration of the solid portion was 10% by weight. As a result, Polymer d was synthesized, in which the diphosphonic acid group was 100% neutralized. The weight average molecular weight of the thus-obtained Polymer d was measured by using GPC.

Synthesis Example e

Synthesis of Polymer e

Polymer e was synthesized in the same manner as in Synthesis Example d except that the monomer represented by Chemical formula 3-2 was changed to the monomer represented by Chemical formula 5. The weight average molecular weight of the thus-obtained Polymer e was measured by using GPC.

Synthesis Example f

Synthesis of Polymer f

Polymer f was synthesized in the same manner as in Synthesis Example d except that the monomer represented by Chemical formula 3-2 was changed to the monomer represented by Chemical formula 6. The weight average molecular weight of the thus-obtained Polymer f was measured by using GPC.

Synthesis Example g

Synthesis of Polymer g

Polymer g was synthesized in the same manner as in Synthesis Example d except that the monomer represented by Chemical formula 3-2 was changed to the monomer represented by Chemical formula 7.

The weight average molecular weight of the thus-obtained Polymer g was measured by using GPC.

Synthesis Example h

Synthesis of Polymer h

Polymer h was synthesized in the same manner as in Synthesis Example d except that the monomer represented by Chemical formula 3-2 was changed to the monomer represented by Chemical formula 8. The weight average molecular weight of the thus-obtained polymer h was measured by using GPC.

Synthesis Example i

Synthesis of Polymer i

Polymer i was synthesized in the same manner as in Synthesis Example d except that the monomer represented by Chemical formula 3-2 was changed to the monomer represented by Chemical formula 9. The weight average molecular weight of the thus-obtained Polymer i was measured by using GPC.

Synthesis Example j-1

Synthesis of Polymer j-1

8.0 parts of the monomer represented by Chemical formula 2-1, 6.0 parts of the monomer represented by Chemical formula 3-2, 6.0 parts of the monomer represented by Chemical formula 4-2, and 113.0 parts of ethanol were placed in a flask followed by stirring to obtain a uniform solution. After nitrogen was blown into this solution for 30 minutes, 1.33 parts of azobis isobutylonitrile was added thereto at 75° C. to conduct polymerization reaction for 4 hours. A viscous material obtained by removing the solvent from the thus-obtained liquid polymerization using an evaporator was added to acetone to retrieve a solid material. While diluting the thus-obtained polymer with water, potassium hydroxide was added followed by three-day dialysis membrane refinement to achieve 100% acid neutralization. Thereafter, the concentration of the resultant was adjusted with water in such a manner that the concentration of the solid portion was 10% by weight. As a result, a copolymer j-1 was synthesized, in which a diphosphonic acid group was 100% neutralized.

The weight average molecular weight of the thus-obtained Polymer j-1 was measured by using GPC.

Synthesis Example j-2

Synthesis of Polymer j-2

Polymer j-2 was synthesized in the same manner as in Synthesis Example j-1 except that the polymerization reaction temperature in Synthesis Example j-1 was changed to 70° C. The weight average molecular weight of the thus-obtained Polymer j-2 was measured by using GPC.

Synthesis Example j-3

Synthesis of Polymer j-3

Polymer j-3 was synthesized in the same manner as in Synthesis Example j-1 except that the polymerization reaction temperature in Synthesis Example j-1 was changed to 65° C. and the polymerization reaction time was changed to 8 hours. The weight average molecular weight of the thus-obtained Polymer j-3 was measured by using GPC.

Synthesis Example j-4

Synthesis of Polymer j-4

Polymer j-4 was synthesized in the same manner as in Synthesis Example j-1 except that the polymerization reaction temperature in Synthesis Example j-1 was changed to 50° C. and the polymerization reaction time was changed to 30 hours. The weight average molecular weight of the thus-obtained Polymer j-4 was measured by using GPC.

Synthesis Example j-5

Synthesis of Polymer j-5

Polymer j-5 was synthesized in the same manner as in Synthesis Example j-1 except that the polymerization reaction temperature in Synthesis Example j-1 was changed to 50° C. and the polymerization reaction time was changed to 40 hours. The weight average molecular weight of the thus-obtained Polymer j-5 was measured by using GPC.

Synthesis Example j-6

Synthesis of Polymer j-6

Polymer j-6 was synthesized in the same manner as in Synthesis Example j-3 except that the amount of the monomer represented by Chemical formula 2-1 was changed to 1.0 part, the amount of the monomer represented by Chemical formula 3-2 was changed to 9.5 parts, and the amount of the monomer represented by Chemical formula 4-2 was changed to 9.5 parts. The weight average molecular weight of the thus-obtained Polymer j-6 was measured by using GPC.

Synthesis Example j-7

Synthesis of Polymer j-7

Polymer j-7 was synthesized in the same manner as in Synthesis Example j-3 except that the amount of the monomer represented by Chemical formula 2-1 was changed to 2.0 parts, the amount of the monomer represented by Chemical formula 3-2 was changed to 9.0 parts, and the amount of the monomer represented by Chemical formula 4-2 was changed to 9.0 parts. The weight average molecular weight of the thus-obtained Polymer j-7 was measured by using GPC.

Synthesis Example j-8

Synthesis of Polymer j-8

Polymer j-8 was synthesized in the same manner as in Synthesis Example j-3 except that the amount of the monomer represented by Chemical formula 2-1 was changed to 12.0 parts, the amount of the monomer represented by Chemical formula 3-2 was changed to 4.0 parts, and the amount of the monomer represented by Chemical formula 4-2 was changed to 4.0 parts. The weight average molecular weight of the thus-obtained Polymer j-8 was measured by using GPC.

Synthesis Example j-9

Synthesis of Polymer j-9

Polymer j-9 was synthesized in the same manner as in Synthesis Example j-3 except that the amount of the monomer represented by Chemical formula 2-1 was changed to 14.0 parts, the amount of the monomer represented by Chemical formula 3-2 was changed to 3.0 parts, and the amount of the monomer represented by Chemical formula 4-2 was changed to 3.0 parts. The weight average molecular weight of the thus-obtained Polymer j-9 was measured by using GPC.

Synthesis Example k

Synthesis of Polymer k 6.0. parts of methyl methacryrate (MMA), 14.0 parts of the monomer represented by Chemical formula 8, and 113.0 parts of ethanol were placed in a flask followed by stirring to obtain a uniform solution. After nitrogen was blown into this solution for 30 minutes, 1.33 parts of azobis isobutylonitrile was added thereto at 60° C. to conduct polymerization reaction for 15 hours. A viscous material obtained by removing the solvent from the thus-obtained liquid polymerization using an evaporator was added to acetone to retrieve a solid material. While diluting the thus-obtained polymer with water, potassium hydroxide was added followed by three-day dialysis membrane refinement to achieve 100% acid neutralization. Thereafter, the concentration of the resultant was adjusted with water in such a manner that the concentration of the solid portion was 10% by weight. Thus, Polymer k was synthesized. The weight average molecular weight of the thus-obtained Polymer k was measured by using GPC.

Synthesis Example 1

Synthesis of Polymer 1

10.0 parts of styrene methacrylate, 10.0 parts of the monomer represented by Chemical formula 6, and 113.0 parts of ethanol were placed in a flask followed by stirring to obtain a uniform solution.

After nitrogen was blown into this solution for 30 minutes, 1.33 parts of azobis isobutylonitrile was added thereto at 60° C. to conduct polymerization reaction for 10 hours. A viscous material obtained by removing the solvent from the thus-obtained liquid polymerization using an evaporator was added to acetone to retrieve a solid material. While diluting the thus-obtained polymer with water, potassium hydroxide was added followed by three-day dialysis membrane refinement to achieve 100% acid neutralization. Thereafter, the concentration of the resultant was adjusted with water in such a manner that the concentration of the solid portion was 10% by weight. Thus, Polymer 1 was synthesized. The weight average molecular weight of the thus-obtained Polymer 1 was measured by using GPC.

Measuring of Weight Average Molecular Weight

The weight average molecular weight was measured according to GPC method using a column constant temperature tank (CTO-20A, manufactured by Shimadzu Corporation), a detector (RID-10A, manufactured by SHIMADZU CORPORATION), an eluent flowing path pump (LC-20AD, manufactured by SHIMADZU Corporation), a deflating equipment (Degasser DGU-20A, manufactured by SHIMADZU COPORATION), and an autosampler (SIL-20A, manufactured by SHIMADZU COPORATION). As a column, aqueous SEC column TSK gel G3000 PWXL having a removal limit molecular weight of $2\times10^5$, TSK gel G5000 PWXL having a removal limit molecular weight of $2.5\times10^6$, and TSK gel G6000 PWXL (all manufactured by Tosoh Corporation) having a removal limit molecular weight of $5\times10^7$ were connected for use. A sample adjusted to be 2 g/100 ml by an eluent was used. As the eluent, an aqueous solution was used in which the content of acetic acid and sodium acetate were adjusted to be 0.5 mol/L for each. The column temperature was set to be 40° C. and the flow speed was set to be 1.0 ml/min. The calibration curve was made by using nine standard samples of polyethylene glycol having a molecular weight of 1,065, 5,050, 24,000, 50,000, 107, 000, 140,000, 250,000, 540,000, and 920,000. The results are shown in Table 1.

TABLE 1

| | | Polymer | | Diphosphonic acid group containing monomer | | Copolymerization matching monomer 1 | |
|---|---|---|---|---|---|---|---|
| | | Molecular weight | Neutralizing salt | Chemical formula | Content ratio | Chemical formula | Content ratio |
| Synthetic Example a | a | 6000 | NaOH | 2-2 | 100% | — | |
| Synthetic Example b | b | 3900 | NaOH | 2-2 | 40% | 3-2 | 60% |
| Synthetic Example c | c | 7200 | DEMA | 2-2 | 40% | 4-2 | 60% |
| Synthetic Example d | d | 8500 | KOH | 2-1 | 40% | 3-2 | 60% |
| Synthetic Example e | e | 8500 | KOH | 2-1 | 40% | 5 | 60% |
| Synthetic Example f | f | 8500 | KOH | 2-1 | 40% | 6 | 60% |
| Synthetic Example g | g | 8500 | KOH | 2-1 | 40% | 7 | 60% |
| Synthetic Example h | h | 8500 | KOH | 2-1 | 40% | 8 | 60% |

TABLE 1-continued

| | | | | | | Copolymerization matching monomer 2 | | Polymerization reaction | |
|---|---|---|---|---|---|---|---|---|---|
| | | | | | | Chemical formula | Content ratio | Temperature | Time |
| Synthetic Example i | i | 8500 | KOH | 2-1 | 40% | 9 | 30% | 65° C. | 4 h |
| Synthetic Example j-1 | j-1 | 3500 | KOH | 2-1 | 40% | 3-2 | 30% | 75° C. | 3 h |
| Synthetic Example j-2 | j-2 | 4000 | KOH | 2-1 | 40% | 3-2 | 30% | 65° C. | 5 h |
| Synthetic Example j-3 | j-3 | 8500 | KOH | 2-1 | 40% | 3-2 | 30% | 65° C. | 8 h |
| Synthetic Example j-4 | j-4 | 49000 | KOH | 2-1 | 40% | 3-2 | 30% | 65° C. | 8 h |
| Synthetic Example j-5 | j-5 | 54000 | KOH | 2-1 | 40% | 3-2 | 30% | 65° C. | 8 h |
| Synthetic Example j-6 | j-6 | 8500 | KOH | 2-1 | 5% | 3-2 | 47.5% | 65° C. | 8 h |
| Synthetic Example j-7 | j-7 | 8500 | KOH | 2-1 | 10% | 3-2 | 45% | 65° C. | 8 h |
| Synthetic Example j-8 | j-8 | 8500 | KOH | 2-1 | 60% | 3-2 | 20% | 65° C. | 8 h |
| Synthetic Example j-9 | j-9 | 8500 | KOH | 2-1 | 70% | 3-2 | 15% | 65° C. | 8 h |
| Comparative Synthetic Example k | k | 9000 | KOH | — | 0% | Methyl methacrylate | 30% | 4-2 | 30% |
| Comparative Synthetic Example l | l | 11000 | KOH | — | 0% | Styrene methacrylate | 50% | 4-2 | 30% |
| Synthetic Example j-1 | | | | | | | | 75° C. | 4 h |
| Synthetic Example j-2 | | | | | | | | 70° C. | 4 h |
| Synthetic Example j-3 | | | | | | | | 65° C. | 8 h |
| Synthetic Example j-4 | | | | | | | | 50° C. | 30 h |
| Synthetic Example j-5 | | | | | | | | 50° C. | 40 h |
| Synthetic Example j-6 | | | | | | | | 65° C. | 8 h |

TABLE 1-continued

| | | | | |
|---|---|---|---|---|
| Synthetic Example j-7 | 4-2 | 45% | 65° C. | 8 h |
| Synthetic Example j-8 | 4-2 | 20% | 65° C. | 8 h |
| Synthetic Example j-9 | 4-2 | 15% | 65° C. | 8 h |
| Comparative Synthetic Example k | 8 | 70% | 60° C. | 15 h |
| Comparative Synthetic Example l | 6 | 50% | 60° C. | 10 h |

DEMA: Diethyl methyl amine

In the case of Polymer k and Polymer l, in which no diphosphonic acid monomer was used, the column of "copolymer matching monomer 1" is read as "polymerizable monomer".

Example 1A

Using a microreactor (ULREA, manufactured by M Technique Co., Ltd.), methanol at −20° C. was caused to flow in a flowing amount rate of 400 mL/min into a thin-layer reactor sandwiched by rotation discs; and a solution kept at 25° C. in which 30 parts of a pigment red No. 81, manufactured by Dainichi Seika Color and Chemicals Mfg. Co., Ltd.) represented by Chemical formula 1a-2 was dissolved in 970 parts of strong sulfuric acid was caused to flow into the same rotation discs at an flowing amount rate of 30 mL/min to precipitate pigment particles; The thus-obtained pigment liquid dispersion was condensed by a centrifugal and diluted with deionized water repeatedly to adjust the pH of the resultant to be around 6, thereby obtaining a pigment paste having a pigment concentration of 30% by weight.

Thereafter, 6.0 parts of Polymer a was dissolved in 44.0 parts of deionized water and mixed with 50 parts of the pigment paste prepared as described above. Thereafter, the resultant was subject to one-hour treatment by an ultrasonic homogenizer to obtain Dispersion Element 1A having a pigment concentration of 15% by weight.

Thereafter, the materials other than the Dispersion Element 1A were dissolved in deionized water to manufacture a vehicle and thereafter the vehicle was mixed with the Dispersion Element 1A followed by filtration with a filter having an opening of 1 μm to obtain Ink for inkjet recording.

| Ink Recipe | |
|---|---|
| Dispersion Element 1A: | 40.0 parts |
| Glycerin: | 10.0 parts |
| 3-ethyl-3-hydroxymethyl oxetane | 15.0 parts |
| N,N-dimethyl-β-methoxy propionamide (Equamide ™ B100, manufactured by IDEMITSU KOSAN CO., LTD.): | 5.0 parts |
| N,N-dimethyl-β-buthoxy propionamide (Equamide ™ M100, manufactured by Idemitsu Co., Ltd.): | 10.0 parts |
| 2-ethyl-1,3-hexane diol: | 2.0 parts |
| Compound represented by Chemical formula 10: | 0.05 parts |
| 2-amino-2-ethyl-1,3-propane diol: | 0.5 parts |
| Preservatives and fungicides (Proxel ™ LV, manufactured by ARCH CHEMICALS JAPAN, INC.): | 0.1 parts |
| Deionized water: | 17.35 parts |

Example 2A

Using a microreactor (ULREA, manufactured by M Technique Co., Ltd.), methanol at −20° C. was caused to flow in a flowing amount rate of 400 mL/min. into a thin-layer reactor sandwiched by rotation discs; and a solution kept at 25° C. in which 30 parts of Cinquasia Magenta RT-243-D, manufactured by BASFF Japan LTD., represented by the Chemical formula 1a-3 was dissolved in 970 parts of strong sulfuric acid was caused to flow into the same rotation discs at an flowing amount rate of 5 mL/min. to precipitate pigment particles; The thus-obtained pigment liquid dispersion was condensed by a centrifugal and diluted with deionized water repeatedly to adjust the pH of the resultant to be around 6, thereby obtaining a pigment paste having a pigment concentration of 30% by weight.

Thereafter, 6.0 parts of Polymer b was dissolved in 44.0 parts of deionized water and mixed with 50 parts of the pigment paste prepared as described above. Thereafter, the resultant was subject to one-hour dispersion treatment by Ultra Aspec Mill UAM015 type, manufactured by KOTOBUKI INDUSTRIES CO., LTD., followed by filtration of the resultant with a filter having an opening size of 1 μm to obtain Dispersion Element 2A having a pigment concentration of 15% by weight.

Ink for inkjet recording was manufactured in the same manner as in Example 1A except that the Dispersion Element 1A was changed to the Dispersion Element 2A.

Example 3A

Dispersion Element 3A having a pigment concentration of 15% was obtained in the same manner as in Example 2A except that Polymer b was changed to Polymer c.

Thereafter, ink for inkjet recording was manufactured in the same manner as in Example 1A except that the Dispersion Element 1A was changed to the Dispersion Element 3A.

Example 4A

A pigment paste having a pigment concentration of 30% by weight was prepared in the same manner as in Example 1A except that the pigment was changed to Hostaperm Pink E02, manufactured by Clariant Japan K.K.) represented by Chemical formula 1a-2 and the flowing amount rate of the pigment solution of strong sulfuric acid flowing into the rotation disks of the microreactor (ULREA) was changed to 20 mL/min.

Thereafter, 6.0 parts of Polymer c was dissolved in 44.0 parts of deionized water and mixed with 50 parts of the pigment paste prepared as described above. Thereafter, the resultant was subject to a half-hour treatment by an ultrasonic wave homogenizer to obtain Dispersion Element 4 having a pigment concentration of 15% by weight.

Ink for inkjet recording was manufactured in the same manner as in Example 1A except that the Dispersion Element 1A was changed to the Dispersion Element 4A.

Example 5A

Using a microreactor (ULREA, manufactured by M Technique Co., Ltd.), methanol at −20° C. was caused to flow in a flowing amount rate of 400 mL/min. into a thin-layer reactor sandwiched by rotation discs; and a solution kept at 25° C. in which 30 parts of a pigment red No. 81, manufactured by Dainichi Seika Color and Chemicals Mfg. Co., Ltd.) represented by Chemical formula 1a-2 was dissolved in 970 parts of strong sulfuric acid was caused to flow into the same rotation discs at an flowing amount rate of 10 mL/min to precipitate pigment particles; The thus-obtained pigment liquid dispersion was condensed by a centrifugal and diluted with deionized water repeatedly to adjust the pH of the resultant to be around 6, thereby obtaining a pigment paste having a pigment concentration of 30% by weight.

Thereafter, 6.0 parts of Polymer c was dissolved in 44.0 parts of deionized water and mixed with 50 parts of the pigment paste prepared as described above. Thereafter, the resultant was subject to one-hour treatment by an ultrasonic homogenizer to obtain a Dispersion Element 5A having a pigment concentration of 15% by weight.

Ink for inkjet recording was manufactured in the same manner as in Example 1A except that the Dispersion Element 1A was changed to the Dispersion Element 5A.

Example 6A

Dispersion Element 6A having a pigment concentration of 15% was obtained in the same manner as in Example 5A except that Polymer c was changed to Polymer d.

Ink for inkjet recording was manufactured in the same manner as in Example 1A except that Dispersion Element 1A was changed to Dispersion Element 6A.

Example 7A

Dispersion Element 7A having a pigment concentration of 15% was obtained in the same manner as in Example 5A except that Polymer c was changed to Polymer e.

Thereafter, ink for inkjet recording was manufactured in the same manner as in Example 1A except that Dispersion Element 1A was changed to Dispersion Element 7A.

Example 8A

Dispersion Element 8A having a pigment concentration of 15% was obtained in the same manner as in Example 5A except that Polymer c was changed to Polymer f.

Ink for inkjet recording was manufactured in the same manner as in Example 1A except that Dispersion Element 1A was changed to Dispersion Element 8A.

Example 9A

Dispersion Element 9A having a pigment concentration of 15% was obtained in the same manner as in Example 5A except that Polymer c was changed to Polymer g.

Thereafter, ink for inkjet recording was manufactured in the same manner as in Example 1A except that Dispersion Element 1A was changed to Dispersion Element 9A.

Example 10A

Dispersion Element 10A having a pigment concentration of 15% was obtained in the same manner as in Example 5A except that Polymer c was changed to Polymer h.

Thereafter, ink for inkjet recording was manufactured in the same manner as in Example 1A except that Dispersion Element 1A was changed to Dispersion Element 10A.

Example 11A

Dispersion Element 11A having a pigment concentration of 15% was obtained in the same manner as in Example 5A except that Polymer c was changed to Polymer i.

Thereafter, ink for inkjet recording was manufactured in the same manner as in Example 1A except that Dispersion Element 1A was changed to Dispersion Element 11A.

Example 12A

Dispersion Element 12A having a pigment concentration of 15% was obtained in the same manner as in Example 5A except that Polymer c was changed to Polymer j-1.

Thereafter, ink for inkjet recording was manufactured in the same manner as in Example 1A except that Dispersion Element 1A was changed to Dispersion Element 12A.

Example 13A

Dispersion Element 13A having a pigment concentration of 15% was obtained in the same manner as in Example 5A except that Polymer c was changed to Polymer j-2.

Thereafter, ink for inkjet recording was manufactured in the same manner as in Example 1A except that Dispersion Element 1A was changed to Dispersion Element 13A.

Example 14A

Dispersion Element 14A having a pigment concentration of 15% was obtained in the same manner as in Example 5A except that Polymer c was changed to Polymer j-3.

Thereafter, ink for inkjet recording was manufactured in the same manner as in Example 1A except that Dispersion Element 1A was changed to Dispersion Element 14A.

Example 15A

Dispersion Element 15A having a pigment concentration of 15% was obtained in the same manner as in Example 5A except that Polymer c was changed to Polymer j-4.

Thereafter, ink for inkjet recording was manufactured in the same manner as in Example 1A except that Dispersion Element 1A was changed to Dispersion Element 15A.

Example 16A

Dispersion Element 16A having a pigment concentration of 15% was obtained in the same manner as in Example 5A except that Polymer c was changed to Polymer j-5.

Thereafter, ink for inkjet recording was manufactured in the same manner as in Example 1A except that Dispersion Element 1A was changed to Dispersion Element 16A.

Example 17A

Dispersion Element 17A having a pigment concentration of 15% was obtained in the same manner as in Example 5A except that Polymer c was changed to Polymer j-6.

Thereafter, ink for inkjet recording was manufactured in the same manner as in Example 1A except that Dispersion Element 1A was changed to Dispersion Element 17A.

Example 18A

Dispersion Element 18A having a pigment concentration of 15% was obtained in the same manner as in Example 5A except that Polymer c was changed to Polymer j-7.

Thereafter, ink for inkjet recording was manufactured in the same manner as in Example 1A except that Dispersion Element 1A was changed to Dispersion Element 18A.

Example 19A

Dispersion Element 19A having a pigment concentration of 15% was obtained in the same manner as in Example 5A except that Polymer c was changed to Polymer j-8.

Thereafter, ink for inkjet recording was manufactured in the same manner as in Example 1A except that Dispersion Element 1A was changed to Dispersion Element 19A.

Example 20A

Dispersion Element 20A having a pigment concentration of 15% was obtained in the same manner as in Example 5A except that Polymer c was changed to Polymer j-9.

Thereafter, ink for inkjet recording was manufactured in the same manner as in Example 1A except that Dispersion Element 1A was changed to Dispersion Element 20A.

Example 21A

A Dispersion Element 21A was manufactured in the same manner and recipe as in Example 5A except that the pigment red No. 81 of Example 5A was changed to the pigment (CINQUASIA VIOLET R RT-101-D, manufactured by BASF Japan LTD.) represented by Chemical formula 1a-1.

Thereafter, ink for inkjet recording was manufactured in the same manner as in Example 1A except that Dispersion Element 1A was changed to Dispersion Element 21A.

Example 22A

Using a microreactor (ULREA, manufactured by M Technique Co., Ltd.), methanol at −20° C. was caused to flow in a flowing amount rate of 400 mL/min into a thin-layer reactor sandwiched by rotation discs; and a solution kept at 25° C. in which 30 parts of CROMOPHTAL JET MAGENTA DMQ, manufactured by BASF Japan, Ltd., represented by the Chemical formula 1a-2 was dissolved in 970 parts of strong sulfuric acid was caused to flow into the same rotation discs at an flowing amount rate of 5 mL/min. to precipitate pigment particles; The thus-obtained pigment liquid dispersion was condensed by a centrifugal and diluted with deionized water repeatedly to adjust the pH of the resultant to be around 6, thereby obtaining a pigment paste having a pigment concentration of 30%.

Thereafter, 6.0 parts of Polymer c was dissolved in 44.0 parts of deionized water and mixed with 50 parts of the pigment paste prepared as described above. Thereafter, the resultant was subject to one-hour treatment by an ultrasonic homogenizer to obtain a Dispersion Element 22A having a pigment concentration of 15% by weight.

Thereafter, ink for inkjet recording was manufactured in the same manner as in Example 1A except that the Dispersion Element 1A was changed to the Dispersion Element 22A.

Example 23A

A Dispersion Element 23A was manufactured in the same manner and recipe as in Example 22A except that the pigment of CROMOPHTHAL JET MAGENTA DMQ was changed to Hostaperm Pink E02, manufactured by Clariant Japan K.K.

Thereafter, ink for inkjet recording was manufactured in the same manner as in Example 1A except that Dispersion Element 1A was changed to Dispersion Element 23A.

Example 24A

Dispersion Element 24A having a pigment concentration of 15% was prepared in the same manner and recipe as in Example 22A except that the flowing amount rate of the pigment solution of strong sulfuric acid flowing into the rotation disks of the microreactor (ULREA) was changed to 10 mL/min.

Thereafter, ink for inkjet recording was manufactured in the same manner as in Example 1A except that Dispersion Element 1A was changed to Dispersion Element 24A.

Comparative Example 1

Thereafter, 6.0 parts of Polymer c was dissolved in 79.0 parts of deionized water and mixed with 15 parts of the same pigment red No. 81, manufactured by Dainichi Seika Color and Chemicals Mfg. Co., Ltd.) as in Example 5A. Thereafter, the resultant was subject to a half-hour dispersion treatment by Ultra Aspec Mill UAM015 type, manufactured by KOTOBUKI INDUSTRIES CO., LTD., followed by filtration of the resultant with a filter having an opening size of 1 μm to obtain Dispersion Element 25A having a pigment concentration of 15%.

Thereafter, ink for inkjet recording was manufactured in the same manner as in Example 1A except that Dispersion Element 1A was changed to Dispersion Element 25A.

Comparative Example 2A

Thereafter, 6.0 parts of Polymer b for use in Example 2A was dissolved in 79.0 parts of deionized water and mixed with 15 parts of the same pigment Cinquasia Magenta RT-243-D, manufactured by BASFF Japan LTD., as in Example 2A Thereafter, the resultant was subject to a one-hour dispersion treatment by Ultra Aspec Mill UAM015 type, manufactured by KOTOBUKI INDUSTRIES CO., LTD., followed by filtration of the resultant with a filter having an opening size of 1 μm to obtain a Dispersion Element 26A having a pigment concentration of 15%.

Thereafter, ink for inkjet recording was manufactured in the same manner as in Example 1A except that Dispersion Element 1A was changed to Dispersion Element 26A.

Comparative Example 3A

Dispersion Element 27A having a pigment concentration of 15% was obtained in the same manner as in Example 5A except that Polymer c was changed to Polymer k.

Thereafter, ink for inkjet recording was manufactured in the same manner as in Example 1A except that Dispersion Element 1A was changed to Dispersion Element 27A.

Comparative Example 4A

Dispersion Element 28A having a pigment concentration of 15% was obtained in the same manner as in Example 21A except that Polymer c was changed to Polymer 1.

Thereafter, ink for inkjet recording was manufactured in the same manner as in Example 1A except that Dispersion Element 1A was changed to Dispersion Element 28A.

Example 1B

Using a microreactor (ULREA, manufactured by M Technique Co., Ltd.), methanol at −20° C. as a poor solvent was caused to flow in a flowing amount rate of 600 mL/min. into a thin-layer reactor sandwiched by rotation discs; and a solution kept at 25° C. in which 20 parts of PIGMENT YELLOW 4G represented by chemical formula 1b (manufactured by Hangzhou Dimachema Imp & Exp Co., Ltd.) was dissolved in a liquid mixture of 49 parts of 0.1 N potassium hydroxide, 147 parts of ethanol, and 784 parts of dimethyl sulfoxide was caused to flow into the same rotation discs at an flowing amount rate of 30 mL/min. to precipitate pigment particles. The thus-obtained pigment liquid dispersion was condensed by a centrifugal and diluted with deionized water repeatedly to adjust the pH of the resultant to be around 8, thereby obtaining a pigment paste having a pigment concentration of 30% by weight.

Thereafter, 6.0 parts of the polymer a was dissolved in 44.0 parts of deionized water and mixed with 50 parts of the pigment paste prepared as described above. Thereafter, the resultant was subject to a half hour treatment by an ultrasonic homogenizer to obtain Dispersion Element 1B having a pigment concentration of 15% by weight.

A vehicle was manufactured by dissolving the ink recipe shown below excluding Dispersion Element 1B in deionized water and thereafter mixing with Dispersion Element 1B followed by filtration having an opening size of 1 μm to obtain ink for inkjet recording.

| Ink Recipe | |
|---|---|
| Dispersion Element 1B: | 40.0 parts |
| Glycerin: | 10.0 parts |
| 3-ethyl-3-hydroxymethyl oxetane | 15.0 parts |
| N,N-dimethyl-β-methoxy propion amide (Equamide ™ B100, manufactured by IDEMITSU KOSAN CO., LTD.): | 5.0 parts |
| N,N-dimethyl-β-buthoxy propion amide (Equamide ™ M100, manufactured by Idemitsu Co., Ltd.): | 10.0 parts |
| 2-ethyl-1,3-hexane diol: | 2.0 parts |
| Compound represented by chemical formula 10: | 0.05 parts |
| 2-amino-2-ethyl-1,3-propane diol: | 0.5 parts |
| Preservatives and fungicides (Proxel ™ LV, manufactured by ARCH CHEMICALS JAPAN, INC.): | 0.1 parts |
| Deionized water: | 17.35 parts |

Example 2B

Using a microreactor (ULREA, manufactured by M Technique Co., Ltd.), methanol at −20° C. as a poor solvent was caused to flow in a flowing amount rate of 400 mL/min. into a thin-layer reactor sandwiched by rotation discs; and a solution kept at 25° C. in which 30 parts of TONER YELLOW 3GP represented by chemical formula 1b (manufactured by Clariant Japan K.K.) was dissolved in a liquid mixture of 49 parts of 0.1 N potassium hydroxide, 147 parts of ethanol, and 784 parts of dimethyl sulfoxide was caused to flow into the same rotation discs at an flowing amount rate of 10 mL/min. to precipitate pigment particles. The thus-obtained pigment liquid dispersion was condensed by a centrifugal and diluted with deionized water repeatedly to adjust the pH of the resultant to be around 6, thereby obtaining a pigment paste having a pigment concentration of 30% by weight.

Thereafter, 6.0 parts of Polymer b was dissolved in 44.0 parts of deionized water and mixed with 50 parts of the pigment paste prepared as described above. Thereafter, the resultant was subject to one-hour dispersion treatment by Ultra Aspec Mill UAM015 type, manufactured by KOTOBUKI INDUSTRIES CO., LTD., followed by filtration of the resultant with a filter having an opening size of 1 μm to obtain Dispersion Element 2B having a pigment concentration of 15% by weight.

Thereafter, ink for inkjet recording was manufactured in the same manner and recipe as in Example 1B except that the Dispersion Element 1B was changed to the Dispersion Element 2B.

Example 3B

Dispersion Element 3B having a pigment concentration of 15% by weight was manufactured in the same manner as in Example 2B except that Polymer b was changed to Polymer c. Thereafter, ink for inkjet recording was manufactured in the same manner and recipe as in Example 1B except that the Dispersion Element 1B was changed to the Dispersion Element 3B.

Example 4B

Using a microreactor (ULREA, manufactured by M Technique Co., Ltd.), methanol at −20° C. as a poor solvent was caused to flow in a flowing amount rate of 400 mL/min. into a thin-layer reactor sandwiched by rotation discs; and a solution kept at 25° C. in which 30 parts of Ink Jet Yellow 4G (manufactured by Clariant Japan K.K.) was dissolved in a liquid mixture potassium hydroxide, ethanol, and dimethyl sulfoxide was caused to flow into the same rotation discs at an flowing amount rate of 10 mL/min to precipitate pigment particles. The thus-obtained pigment liquid dispersion was condensed by a centrifugal and diluted with deionized water repeatedly to adjust the pH of the resultant to be around 6, thereby obtaining a pigment paste having a pigment concentration of 30% by weight.

Thereafter, 6.0 parts of Polymer c was dissolved in 44.0 parts of deionized water and mixed with 50 parts of the pigment paste prepared as described above. Thereafter, the resultant was subject to one-hour treatment by an ultrasonic homogenizer to obtain Dispersion Element 4B having a pigment concentration of 15% by weight.

Thereafter, ink for inkjet recording was manufactured in the same manner and recipe as in Example 1B except that Dispersion Element 1B was changed to Dispersion Element 4B.

Example 5B

Dispersion Element 5B having a pigment concentration of 15% by weight was manufactured in the same manner as in Example 4B except that Polymer c was changed to Polymer d. Thereafter, ink for inkjet recording was manufactured in the same manner and recipe as in Example 1B except that Dispersion Element 1B was changed to Dispersion Element 5B.

Example 6B

Dispersion Element 6B having a pigment concentration of 15% by weight was manufactured in the same manner as in Example 4B except that Polymer c was changed to Polymer e. Thereafter, ink for inkjet recording was manufactured in the same manner and recipe as in Example 1B except that Dispersion Element 1B was changed to Dispersion Element 6B.

Example 7B

Dispersion Element 7B having a pigment concentration of 15% by weight was manufactured in the same manner as in Example 4B except that Polymer c was changed to Polymer f. Thereafter, ink for inkjet recording was manufactured in the same manner and recipe as in Example 1B except that Dispersion Element 1B was changed to Dispersion Element 7B.

Example 8B

Dispersion Element 8B having a pigment concentration of 15% by weight was manufactured in the same manner as in Example 4B except that Polymer c was changed to Polymer g. Thereafter, ink for inkjet recording was manufactured in the same manner and recipe as in Example 1B except that Dispersion Element 1B was changed to Dispersion Element 8B.

Example 9B

Dispersion Element 9B having a pigment concentration of 15% by weight was manufactured in the same manner as in Example 4B except that Polymer c was changed to Polymer h. Thereafter, ink for inkjet recording was manufactured in the same manner and recipe as in Example 1B except that Dispersion Element 1B was changed to Dispersion Element 9B.

Example 10B

Dispersion Element 10B having a pigment concentration of 15% by weight was manufactured in the same manner as in Example 4B except that Polymer c was changed to Polymer i. Thereafter, ink for inkjet recording was manufactured in the same manner and recipe as in Example 1B except that Dispersion Element 1B was changed to Dispersion Element 10B.

Example 11B

Dispersion Element 10B having a pigment concentration of 15% by weight was manufactured in the same manner as in Example 4B except that Polymer c was changed to Polymer j-1. Thereafter, ink for inkjet recording was manufactured in the same manner and recipe as in Example 1B except that Dispersion Element 1B was changed to Dispersion Element 11B.

Example 12B

Dispersion Element 12B having a pigment concentration of 15% by weight was manufactured in the same manner as in Example 4B except that Polymer c was changed to Polymer j-2. Thereafter, ink for inkjet recording was manufactured in the same manner and recipe as in Example 1B except that Dispersion Element 1B was changed to Dispersion Element 12B.

Example 13B

Dispersion Element 13B having a pigment concentration of 15% by weight was manufactured in the same manner as in Example 4B except that Polymer c was changed to Polymer j-3. Thereafter, ink for inkjet recording was manufactured in the same manner and recipe as in Example 1B except that Dispersion Element 1B was changed to Dispersion Element 13B.

Example 14B

Dispersion Element 14B having a pigment concentration of 15% by weight was manufactured in the same manner as in Example 4B except that Polymer c was changed to Polymer j-4. Thereafter, ink for inkjet recording was manufactured in the same manner and recipe as in Example 1B except that Dispersion Element 1B was changed to Dispersion Element 14B.

Example 15B

Dispersion Element 15B having a pigment concentration of 15% by weight was manufactured in the same manner as in Example 4B except that Polymer c was changed to Polymer j-5. Thereafter, ink for inkjet recording was manufactured in the same manner and recipe as in Example 1B except that Dispersion Element 1B was changed to Dispersion Element 15B.

Example 16B

Dispersion Element 16B having a pigment concentration of 15% by weight was manufactured in the same manner as in Example 4B except that Polymer c was changed to Polymer j-6. Thereafter, ink for inkjet recording was manufactured in the same manner and recipe as in Example 1B except that Dispersion Element 1B was changed to Dispersion Element 16B.

Example 17B

Dispersion Element 17B having a pigment concentration of 15% by weight was manufactured in the same manner as in Example 4B except that Polymer c was changed to Polymer j-7. Thereafter, ink for inkjet recording was manufactured in the same manner and recipe as in Example 1B except that Dispersion Element 1B was changed to Dispersion Element 17B.

Example 18

Dispersion Element 18B having a pigment concentration of 15% by weight was manufactured in the same manner as in Example 4B except that Polymer c was changed to Polymer j-8. Thereafter, ink for inkjet recording was manufactured in the same manner and recipe as in Example 1B except that Dispersion Element 1B was changed to Dispersion Element 18B.

Example 19B

Dispersion Element 19B having a pigment concentration of 15% by weight was manufactured in the same manner as in Example 4B except that Polymer c was changed to Polymer j-9. Thereafter, ink for inkjet recording was manufactured in the same manner and recipe as in Example 1B except that Dispersion Element 1B was changed to Dispersion Element 19B.

Example 20B

Dispersant Element 20B having a pigment concentration of 15% by weight was was manufactured in the same manner and recipe as in Example 4 except that Ink Jet Yellow 4G (manufactured by Clariant Japan K.K.) was changed to the pigment TONER YELLOW 3GP (manufactured by Clariant Japan K.K.) represented by Chemical formula 1b. Thereafter, ink for inkjet recording was manufactured in the same manner and recipe as in Example 1B except that Dispersion Element 1B was changed to Dispersion Element 20B.

Example 21B

Dispersion Element 21B having a pigment concentration of 15% by weight was manufactured in the same manner as in Example 1B except the flowing amount of the pigment solution flown into the rotation disk was changed from 30 ml/minute to 10 ml/minute. Thereafter, ink for inkjet recording was manufactured in the same manner and recipe as in Example 1B except that Dispersion Element 1B was changed to Dispersion Element 21B.

Example 22B

Dispersion Element 22B having a pigment concentration of 15% by weight was manufactured in the same manner as in Example 4B except the flowing amount of the pigment solution flown into the rotation disk was changed from 10 ml/minute to 5 ml/minute. Thereafter, ink for inkjet recording was manufactured in the same manner and recipe as in Example 1B except that Dispersion Element 1B was changed to Dispersion Element 22B.

Comparative Example 1B

Thereafter, 6.0 parts of Polymer c for use in Example 4B was dissolved in 79.0 parts of deionized water and mixed with 15 parts of the Ink Jet Yellow 4G (manufactured by Clariant Japan K.K.). Thereafter, the resultant was subject to a one-hour dispersion treatment by Ultra Aspec Mill UAM015 type, manufactured by KOTOBUKI INDUSTRIES CO., LTD., followed by filtration of the resultant with a filter having an opening size of 1 µm to obtain a Dispersion Element 23B having a pigment concentration of 15% by weight. Thereafter, ink for inkjet recording was manufactured in the same manner and recipe as in Example 1B except that Dispersion Element 1B was changed to Dispersion Element 23B.

Comparative Example 2B

Thereafter, 6.0 parts of Polymer b for use in Example 2B was dissolved in 79.0 parts of deionized water and mixed with 15 parts of TONER YELLOW 3GP (manufactured by Clariant Japan K.K.). Thereafter, the resultant was subject to a one-hour dispersion treatment by Ultra Aspec Mill UAM015 type, manufactured by KOTOBUKI INDUSTRIES CO., LTD., followed by filtration of the resultant with a filter having an opening size of 1 µm to obtain a Dispersion Element 24B having a pigment concentration of 15% by weight. Thereafter, ink for inkjet recording was manufactured in the same manner and recipe as in Example 1B except that Dispersion Element 1B was changed to Dispersion Element 24B.

Comparative Example 3B

Dispersion Element 25B having a pigment concentration of 15% by weight was manufactured in the same manner as in Example 4B except that Polymer c was changed to Polymer k. Thereafter, ink for inkjet recording was manufactured in the same manner and recipe as in Example 1B except that Dispersion Element 1B was changed to Dispersion Element 25B.

Comparative Example 4B

Dispersion Element 26B having a pigment concentration of 15% by weight was manufactured in the same manner as in Example 21B except that Polymer c was changed to Polymer l. Thereafter, ink for inkjet recording was manufactured in the same manner and recipe as in Example 1B except that Dispersion Element 1B was changed to Dispersion Element 26B.

The results of the ink recipes in Examples and Comparative Examples are shown in Tables 2 and 3.

In Table 2, "Content" means the content to ink

TABLE 2

| | | | Pigment | | |
|---|---|---|---|---|---|
| | Polymer | Dispersion element | Chemical formula | Product name | Content |
| Example 1A | a | 1A | 1a-2 | Red No 81. | 6% |
| Example 2A | b | 2A | 1a-3 | CMRT | 6% |
| Example 3A | c | 3A | 1a-3 | CMRT | 6% |
| Example 4A | c | 4A | 1a-2 | HPE | 6% |
| Example 5A | c | 5A | 1a-2 | Red No 81 | 6% |
| Example 6A | d | 6A | 1a-2 | Red No 81 | 6% |
| Example 7A | e | 7A | 1a-2 | Red No 81 | 6% |
| Example 8A | f | 8A | 1a-2 | Red No 81 | 6% |
| Example 9A | g | 9A | 1a-2 | Red No 81 | 6% |
| Example 10A | h | 10A | 1a-2 | Red No 81 | 6% |
| Example 11A | i | 11A | 1a-2 | Red No 81 | 6% |
| Example 12A | j-1 | 12A | 1a-2 | Red No 81 | 6% |
| Example 13A | j-2 | 13A | 1a-2 | Red No 81 | 6% |
| Example 14A | j-3 | 14A | 1a-2 | Red No 81 | 6% |
| Example 15A | j-4 | 15A | 1a-2 | Red No 81 | 6% |
| Example 16A | j-5 | 16A | 1a-2 | Red No 81 | 6% |
| Example 17A | J-6 | 17A | 1a-2 | Red No 81 | 6% |
| Example 18A | j-7 | 18A | 1a-2 | Red No 81 | 6% |
| Example 19A | j-8 | 19A | 1a-2 | Red No 81 | 6% |
| Example 20A | j-9 | 20A | 1a-2 | Red No 81 | 6% |
| Example 21A | c | 21A | 1a-1 | CVRRT | 6% |
| Example 22A | c | 22A | 1a-2 | CJMD | 6% |
| Example 23A | c | 23A | 1a-2 | HPE | 6% |
| Example 24A | c | 24A | 1a-2 | CJMD | 6% |
| Comparative Example 1A | c | 25A | 1a-2 | Red No 81 | 6% |
| Comparative Example 2A | b | 26A | 1a-3 | CMRT | 6% |
| Comparative Example 3A | k | 27A | 1a-2 | Red No 81 | 6% |
| Comparative Example 4A | l | 28A | 1a-1 | CVRRT | 6% |

TABLE 3

| | Polymer | Dispersion element | Pigment Kind | Pigment Content |
|---|---|---|---|---|
| Example 1B | a | 1B | P.Y.4G | 6% |
| Example 2B | b | 2B | T.Y.3GP | 6% |
| Example 3B | c | 3B | I.J.Y.4G | 6% |
| Example 4B | c | 4B | I.J.Y.4G | 6% |
| Example 5B | d | 5B | I.J.Y.4G | 6% |
| Example 6B | e | 6B | I.J.Y.4G | 6% |
| Example 7B | f | 7B | I.J.Y.4G | 6% |
| Example 8B | g | 8B | I.J.Y.4G | 6% |
| Example 9B | h | 9B | I.J.Y.4G | 6% |
| Example 10B | i | 10B | I.J.Y.4G | 6% |
| Example 11B | j-1 | 11B | I.J.Y.4G | 6% |
| Example 12B | j-2 | 12B | I.J.Y.4G | 6% |
| Example 13B | j-3 | 13B | I.J.Y.4G | 6% |
| Example 14B | j-4 | 14B | I.J.Y.4G | 6% |
| Example 15B | j-5 | 15B | I.J.Y.4G | 6% |
| Example 16B | J-6 | 16B | I.J.Y.4G | 6% |
| Example 17B | j-7 | 17B | I.J.Y.4G | 6% |
| Example 18B | j-8 | 18B | I.J.Y.4G | 6% |
| Example 19B | j-9 | 19B | I.J.Y.4G | 6% |
| Example 20B | c | 20B | T.Y.3GP | 6% |
| Example 21B | a | 21B | P.Y.4G | 6% |
| Example 22B | c | 22B | I.J.Y.4G | 6% |
| Comparative Example 1B | c | 23B | I.J.Y.4G | 6% |
| Comparative Example 2B | b | 24B | T.Y.3GP | 6% |
| Comparative Example 3B | k | 25B | I.J.Y.4G | 6% |
| Comparative Example 4B | l | 26B | P.Y.4G | 6% |

Evaluation Method and Evaluation Result

The evaluation items and the evaluation methods for the dispersion elements and ink for inkjet recording manufactured in Examples and Comparative Examples are described below.

(1) Measuring of X Ray Diffraction Spectrum

To measure X-ray diffraction spectra of the pigments manufactured in Examples and Comparative Examples, X'Pert Pro (manufactured by PANalytical Co.) was used. Using a Cu enclosure tube (Kα characteristic X-ray: wavelength of 1,541 Å) as an X-ray generator, the measuring was conducted under the conditions of a measuring range $2\theta$ of from 3.0° to 35.0°, a sampling width of 0.02°, and a cumulative time of 1.0 second. With regard to the X-ray diffraction measuring of the pigments of Examples, pigment powder was prepared for measuring by removing moisture from the pigment pastes prior to dispersion by heating them to 50° C. with a reduced pressure. With regard to the X-ray diffraction measuring of the pigments of Comparative Examples, the pigment powder prior to dispersion was used for measuring. FIGS. 5 to 8 illustrate X-ray diffraction spectra of Example 22A, Example 4B, Comparative Example 1A, and Comparative Example 1B.

The peak in the present disclosure is determined as a peak having a maximum width of 0.5° or greater in a graph of smoothed data and a single local maximal value.

To be specific, after smoothing processing to remove noises from X-ray diffraction intensity data, a smoothing filter according to a moving-average method was used to average five sets of data including the calculation target data, two sets of data therebefore, and two kinds of data thereafter to replace the calculation target data if the data were digital. The smoothing processing was conducted by drawing a smooth curve that passed through the average of the noises if the data were analogue. Thereafter, a straight base line having a length of 0.5° or greater in the X axis direction was drawn in such a manner that only one peak was present on the smoothed data in the range sandwiched by both ends of the base line. If a base line satisfying this condition was drawn and a peak was present within a range of $2\theta$ of from 28.0° to 29.0°, the peak was determined to be present. Unless otherwise, it was determined that there was no peak.

Figure 5:
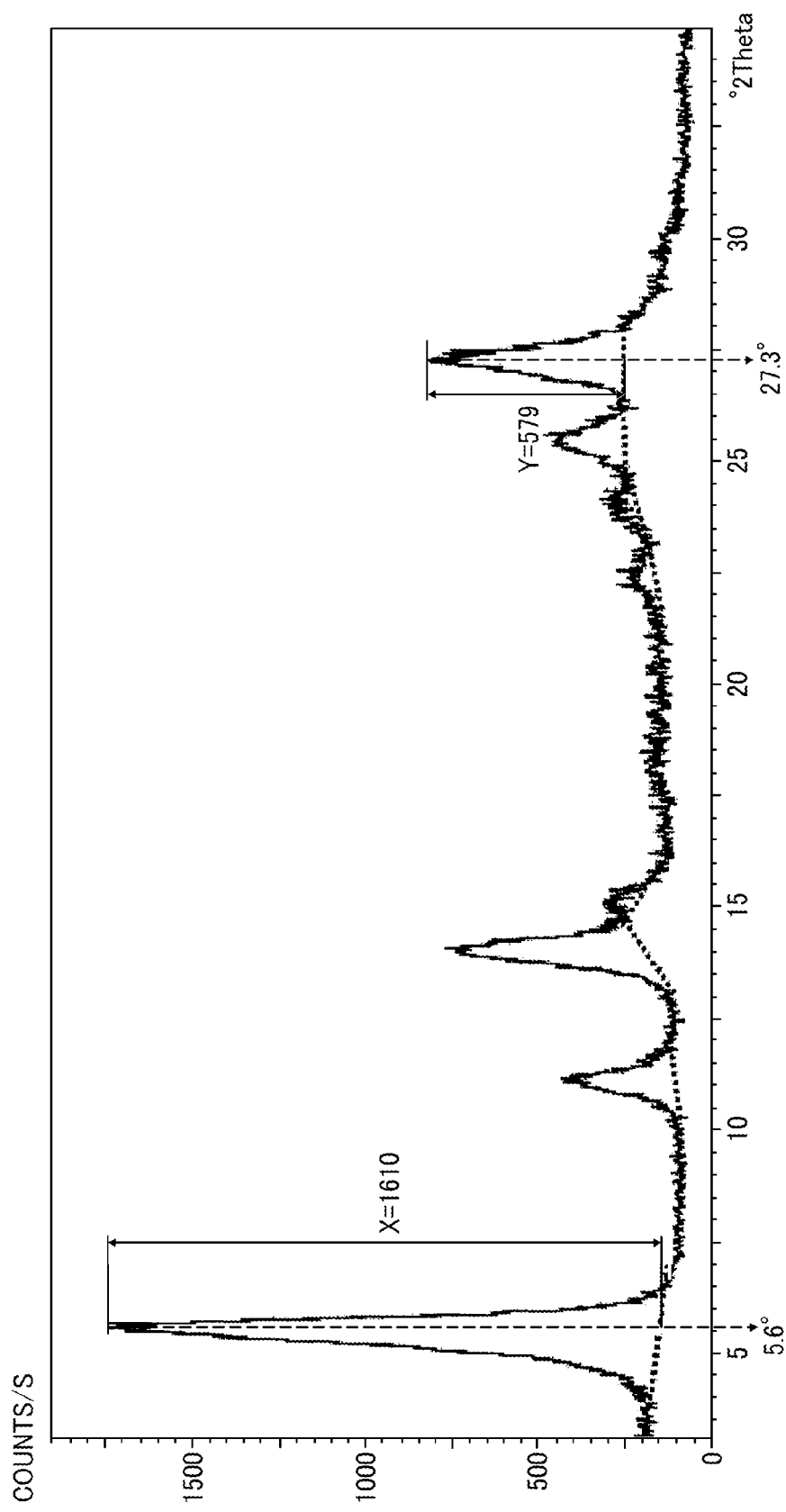
FIG. 5 is a schematic diagram to obtain the peak intensity from an X-ray diffraction spectrum of Example 22A described later.
Figure 6:
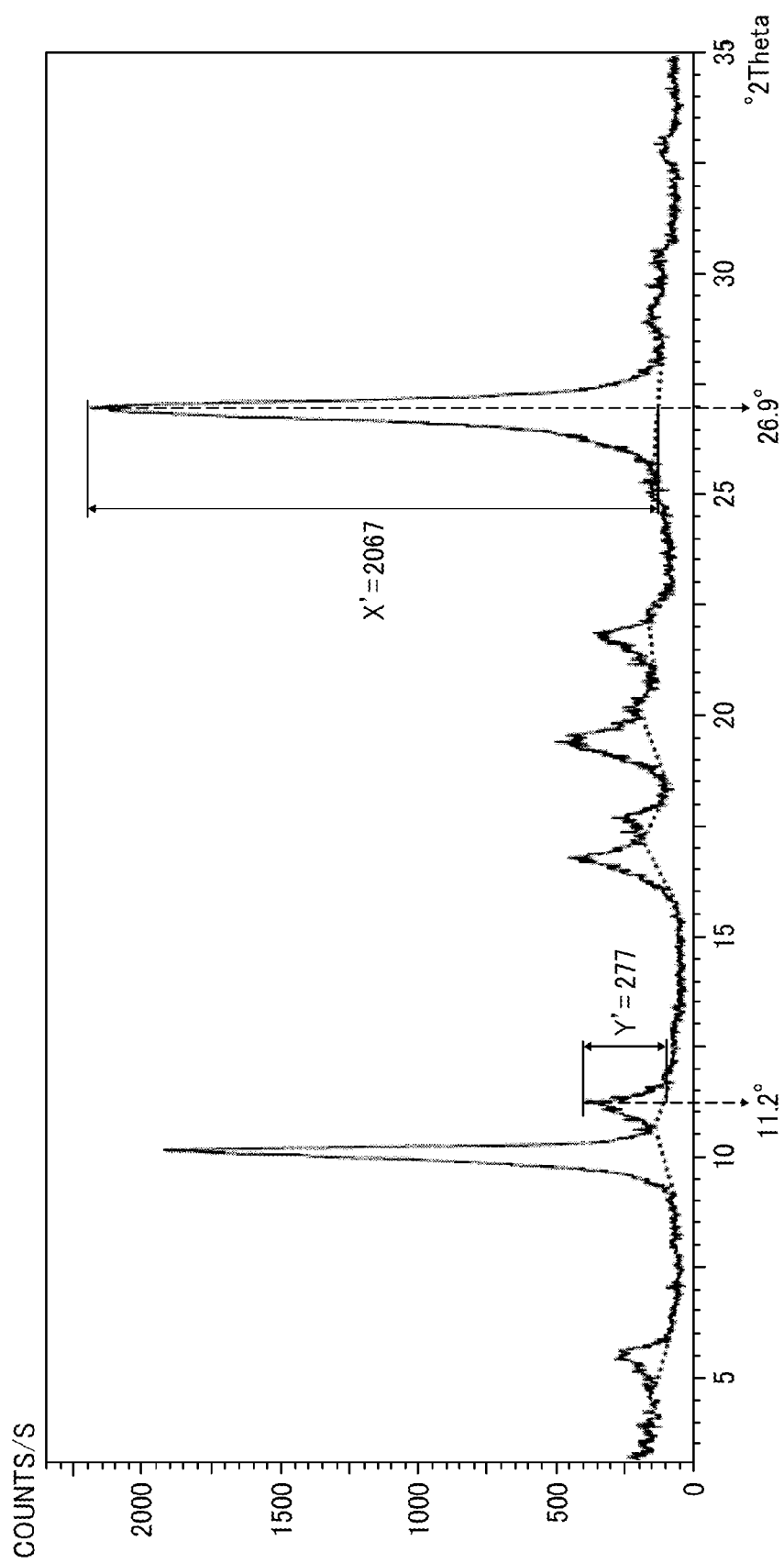
FIG. 6 is a schematic diagram to obtain the peak intensity from an X-ray diffraction spectrum of Example 4B described later.
Figure 7:
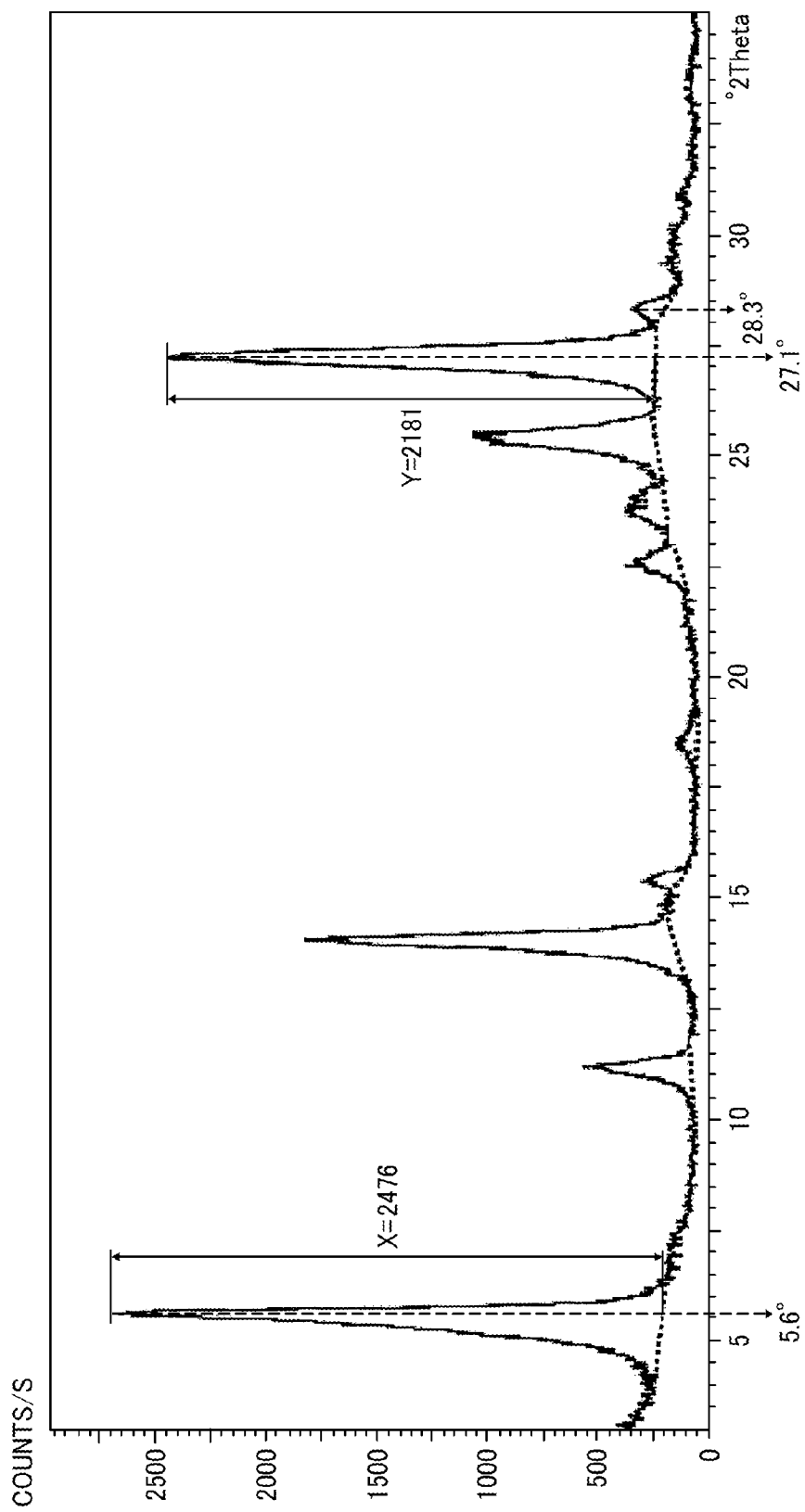
FIG. 7 is a schematic diagram to obtain the peak intensity from an X-ray diffraction spectrum of Comparative Example 1A described later.
Figure 8:
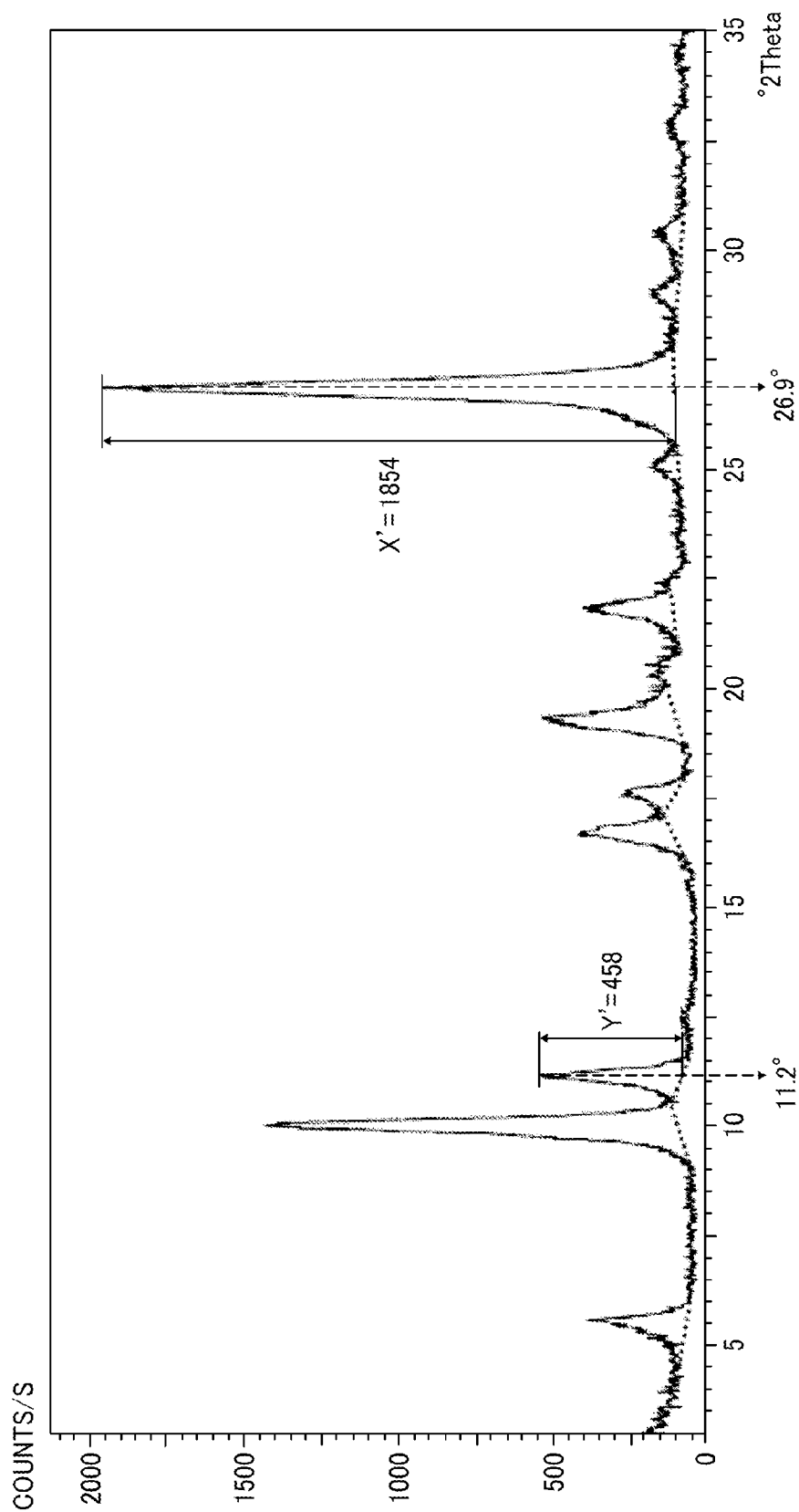
FIG. 8 is a schematic diagram to obtain the peak intensity from an X-ray diffraction spectrum of Comparative Example 1B described later.

With regard to Examples 1A to 24A and Comparative Examples 1A to 4A, the results of determination of whether the peak existed in a range of $2\theta$ of from 28.0° to 29.0° from the obtained X-ray diffraction spectrum are shown in Table 4. In addition, as illustrated in FIGS. 5 and 6, the peak intensities X and Y were of the peaks ascribable to the crystal based on the halo portion ascribable to the non-crystal. The results of X, Y, Y/X, X', Y', Y'/X' are shown in Tables 4 and 5.

In Table 4, Chemical formula 1-1, Chemical formula 1-2, and Chemical formula 1-3 are Chemical formula 1a-1, Chemical formula 1a-2, and Chemical formula 1a-3, respectively.

TABLE 4

| | Pigment Chemical formula | Y/X | Peak X $2\theta$ | Peak X X | Peak Y $2\theta$ | Peak Y Y | Peak? | Base line width (°) |
|---|---|---|---|---|---|---|---|---|
| Example 1A | 1-2 | 0.792 | 5.6 | 1812 | 27.2 | 1436 | No | 0.4 |
| Example 2A | 1-3 | 0.773 | 5.6 | 1308 | 27.0 | 1011 | No | 0.4 |
| Example 3A | 1-3 | 0.773 | 5.6 | 1308 | 27.0 | 1011 | No | 0.4 |
| Example 4A | 1-2 | 0.713 | 5.5 | 1975 | 27.1 | 1408 | Yes | 0.5 |
| Example 5A | 1-2 | 0.545 | 5.7 | 1742 | 27.1 | 950 | No | 0.3 |
| Example 6A | 1-2 | 0.545 | 5.7 | 1742 | 27.1 | 950 | No | 0.3 |
| Example 7A | 1-2 | 0.545 | 5.7 | 1742 | 27.1 | 950 | No | 0.3 |
| Example 8A | 1-2 | 0.545 | 5.7 | 1742 | 27.1 | 950 | No | 0.3 |
| Example 9A | 1-2 | 0.545 | 5.7 | 1742 | 27.1 | 950 | No | 0.3 |
| Example 10A | 1-2 | 0.545 | 5.7 | 1742 | 27.1 | 950 | No | 0.3 |
| Example 11A | 1-2 | 0.545 | 5.7 | 1742 | 27.1 | 950 | No | 0.3 |
| Example 12A | 1-2 | 0.545 | 5.7 | 1742 | 27.1 | 950 | No | 0.3 |
| Example 13A | 1-2 | 0.545 | 5.7 | 1742 | 27.1 | 950 | No | 0.3 |
| Example 14A | 1-2 | 0.545 | 5.7 | 1742 | 27.1 | 950 | No | 0.3 |
| Example 15A | 1-2 | 0.545 | 5.7 | 1742 | 27.1 | 950 | No | 0.3 |
| Example 16A | 1-2 | 0.545 | 5.7 | 1742 | 27.1 | 950 | No | 0.3 |
| Example 17A | 1-2 | 0.545 | 5.7 | 1742 | 27.1 | 950 | No | 0.3 |
| Example 18A | 1-2 | 0.545 | 5.7 | 1742 | 27.1 | 950 | No | 0.3 |
| Example 19A | 1-2 | 0.545 | 5.7 | 1742 | 27.1 | 950 | No | 0.3 |
| Example 20A | 1-2 | 0.545 | 5.7 | 1742 | 27.1 | 950 | No | 0.3 |
| Example 21A | 1-1 | 0.463 | 5.9 | 1740 | 26.9 | 806 | No | 0.2 |
| Example 22A | 1-2 | 0.360 | 5.6 | 1610 | 27.3 | 579 | No | 0.1 |
| Example 23A | 1-2 | 0.000 | 5.5 | 1214 | — | 0 | No | 0.0 |
| Example 24A | 1-2 | 0.594 | 5.6 | 1802 | 27.3 | 1070 | No | 0.4 |
| Comparative Example 1A | 1-2 | 0.881 | 5.6 | 2476 | 27.1 | 2181 | Yes | 0.7 |
| Comparative Example 2A | 1-3 | 0.806 | 5.8 | 2060 | 27.2 | 1661 | No | 0.4 |
| Comparative Example 3A | 1-2 | 0.545 | 5.7 | 1742 | 27.1 | 950 | No | 0.3 |
| Comparative Example 4A | 1-1 | 0.463 | 5.9 | 1740 | 26.9 | 806 | No | 0.2 |

TABLE 5

|  | Y'/X' | Peak X' | | Peak Y' | |
|---|---|---|---|---|---|
|  |  | 2θ | X' | 2θ | Y' |
| Example 1B | 0.198 | 26.9 | 2023 | 11.2 | 401 |
| Example 2B | 0.177 | 27.0 | 2064 | 11.2 | 366 |
| Example 3B | 0.177 | 27.0 | 2064 | 11.2 | 366 |
| Example 4B | 0.134 | 26.9 | 2067 | 11.2 | 277 |
| Example 5B | 0.134 | 26.9 | 2067 | 11.2 | 277 |
| Example 6B | 0.134 | 26.9 | 2067 | 11.2 | 277 |
| Example 7B | 0.134 | 26.9 | 2067 | 11.2 | 277 |
| Example 8B | 0.134 | 26.9 | 2067 | 11.2 | 277 |
| Example 9B | 0.134 | 26.9 | 2067 | 11.2 | 277 |
| Example 10B | 0.134 | 26.9 | 2067 | 11.2 | 277 |
| Example 11B | 0.134 | 26.9 | 2067 | 11.2 | 277 |
| Example 12B | 0.134 | 26.9 | 2067 | 11.2 | 277 |
| Example 13B | 0.134 | 26.9 | 2067 | 11.2 | 277 |
| Example 14B | 0.134 | 26.9 | 2067 | 11.2 | 277 |
| Example 15B | 0.134 | 26.9 | 2067 | 11.2 | 277 |
| Example 16B | 0.134 | 26.9 | 2067 | 11.2 | 277 |
| Example 17B | 0.134 | 26.9 | 2067 | 11.2 | 277 |
| Example 18B | 0.134 | 26.9 | 2067 | 11.2 | 277 |
| Example 19B | 0.134 | 26.9 | 2067 | 11.2 | 277 |
| Example 20B | 0.104 | 27.0 | 1980 | 11.4 | 205 |
| Example 21B | 0.102 | 26.8 | 1860 | 11.1 | 189 |
| Example 22B | 0.065 | 27.3 | 1890 | 11.0 | 123 |
| Comparative Example 1B | 0.247 | 26.9 | 1854 | 11.2 | 458 |
| Comparative Example 2B | 0.211 | 27.0 | 2196 | 11.4 | 463 |
| Comparative Example 3B | 0.134 | 26.9 | 2067 | 11.2 | 277 |
| Comparative Example 4B | 0.102 | 26.8 | 1860 | 11.1 | 189 |

2. Measuring of Color (Saturation)

The ink for inkjet recording manufactured in Examples and Comparative Examples were supplied to an inkjet printer (IPSiO GX e5500, manufactured by RICOH CO., LTD.) having the structure illustrated in FIGS. 1 and 2 and a solid image was printed with one pass. The solid image was printed on the following recording media for evaluation. After the image were dried, the luminance thereof was measured by a reflection type color spectrodensitometer (X-Rite 938, manufactured by X-Rite Incorporate).

Saturation $C^*$ was calculated by the relation: $C^* = \{(a^*)^2 + (b^*)^2\}^{1/2}$ from the obtained values $a^*$ and $b^*$. The ratio k of the saturation value $C^*$ to the saturation value $C^*_0$ (=91.34) of the standard color (Japan color ver. 2) was calculated by the relation: $k = C^*/C^*_0$ and evaluated according to the following evaluation criteria. The results are shown in Tables 6 and 7. Grades A and B are allowable in the evaluation criteria.

Evaluation Sheet

Plain Paper 1: BP-PAPER GF-500 (A4, manufactured by Canon Inc.)

Plain Paper 2: Fore Multi-Purpose (manufactured by HAMMERMILL)

Coated paper: MIRROR COAT Platinum (manufactured by OJI PAPER CO., LTD.)

Evaluation Criteria

A: k≥1.1
B: 1.1>k≥1.0
C: 1.0>k≥0.9
D: 0.9>k

3. Storage Stability of Pigment Dispersion Element

Each pigment dispersion element was placed in a polyethylene container, sealed, and stored at 70° C. for 10 days. The fluctuation ratio of the viscosity after storage to the viscosity before storage was obtained from the following relation and evaluated according to the following criteria.

Fluctuation ratio of viscosity (%)=(Viscosity of pigment dispersion element after storage)/viscosity of pigment dispersion element before storage)×100

The viscosity was measured by a viscometer (RE80L, manufactured by TOKI SANGYO CO., LTD.) to measure the viscosity of the ink at 25° C. at 50 rotations or 100 rotations. Viscometers have a viscosity range in which viscosity is accurately measured according to the number of rotations. Therefore, either 50 rotations or 100 rotations was selected depending on the viscosity of the pigment dispersion element. The evaluation results are shown in Tables 6 and 7.

Evaluation Criteria

A: Fluctuation ratio of viscosity within + or −5%
B: Fluctuation ratio of viscosity within −10% to less than −5% and more than 5% to 10%
C: Fluctuation ratio of viscosity within −30% to less than −10% and more than 10% to 30%
D: Fluctuation ratio of viscosity less than 30% or greater than 30% (gelated to the degree that evaluation was not possible)

4. Storage Stability of Ink

An ink cartridge was filled with each ink and stored at 70° C. for 10 days. The fluctuation ratio of the viscosity after storage to the viscosity before storage was obtained from the following relation and evaluated according to the following criteria.

The fluctuation ratio of viscosity (%)=(Viscosity of ink after storage)/viscosity of ink before storage)×100

The viscosity was measured by a viscometer (RE80L, manufactured by TOKI SANGYO CO., LTD.) to measure the viscosity of the ink at 25° C. at 50 rotations or 100 rotation. Viscometers have a viscosity range in which viscosity is accurately measured according to the number of rotations. Therefore, either 50 rotations or 100 rotations was selected depending on the viscosity of the pigment dispersion element. The evaluation results are shown in Tables 6 and 7.

Evaluation Criteria

A: Fluctuation ratio of viscosity within + or −5%
B: Fluctuation ratio of viscosity within −10% to less than −5% and more than 5% to 10%
C: Fluctuation ratio of viscosity within −30% to less than −10% and more than 10% to 30%
D: Fluctuation ratio of viscosity less than 30% or greater than 30% (gelated to the degree that evaluation was not possible)

5. Evaluation of Discharging Stability

The ink for inkjet recording manufactured in Examples and Comparative Examples was set in a printer (IPSiO Gx e5500, manufacture by RICOH CO., LTD.) having a configuration illustrated in FIGS. 1 and 2 and evaluated about the discharging stability by the following method.

Images were continuously printed for 10 minutes using the printer in which the nozzle plates described above were set. After leaving the printer at 50° C. and 60% RH for one month with a moisture retention cap on the head surface while the ink was attached thereto, the head was returned to the same state as before the leaving after cleaning the head. Thereafter, an intermittent printing test was conducted under the following conditions and the discharging stability was evaluated.

That is, the following printing pattern chart was printed on 20 sheets continuously and printing was halt for 20 minutes. This cycle was repeated 50 times to print the chart on 1,000 sheets in total and thereafter the printing pattern chart was printed on one more sheet, which was visually checked to evaluate the image with regard to streaks, white out, disturbance of jetting (discharging) of 5% chart solid portion according to the following criteria. The printing pattern had a printing area of 5% for each color in the entire area of the sheet and was printed with each ink under 100% duty. The printing condition is that the printing density is 600 dpi×300 dpi with one pass printing. The evaluation criteria are as follows: Grades A and B are allowable. The evaluation results are shown in Tables 6 and 7.

Evaluation Criteria

A: no streaks, no white out, no jetting disturbance observed in solid portion

B: slight streaks, white out, jetting disturbance observed in the solid portion

C: streaks, white out, jetting disturbance observed in the solid portion

D: streaks, white out, jetting disturbance observed all over the solid portion

TABLE 6

| | Saturation (coloring property) | | | Storage stability | | |
|---|---|---|---|---|---|---|
| | Plain paper 1 | Plain paper 2 | Coated paper | (pigment dispersion element) | Storage stability (ink) | Discharging stability |
| Example 1A | B | B | A | B | B | B |
| Example 2A | B | A | A | A | B | B |
| Example 3A | B | A | A | B | B | A |
| Example 4A | B | A | B | A | B | A |
| Example 5A | A | A | A | A | B | A |
| Example 6A | A | A | A | B | A | A |
| Example 7A | A | A | A | B | B | A |
| Example 8A | A | A | A | B | B | B |
| Example 9A | A | A | A | B | A | B |
| Example 10A | A | A | A | B | A | B |
| Example 11A | A | A | A | B | A | B |
| Example 12A | A | A | A | A | B | B |
| Example 13A | A | A | A | A | A | A |
| Example 14A | A | A | A | A | A | A |
| Example 15A | A | A | A | A | A | A |
| Example 16A | A | A | A | A | B | B |
| Example 17A | B | B | A | B | A | A |
| Example 18A | B | A | A | A | A | A |
| Example 19A | A | A | A | A | A | A |
| Example 20A | A | A | A | B | B | A |
| Example 21A | A | A | A | A | B | A |
| Example 22A | A | A | A | B | A | A |
| Example 23A | A | A | A | B | A | A |
| Example 24A | A | A | A | B | B | A |
| Comparative Example 1A | C | B | C | A | B | A |
| Comparative Example 2A | D | B | C | A | B | B |
| Comparative Example 3A | C | C | B | B | C | C |
| Comparative Example 4A | D | B | A | C | B | B |

TABLE 7

| | Saturation (coloring property) | | | Storage stability | | |
|---|---|---|---|---|---|---|
| | Plain paper 1 | Plain paper 2 | Coated paper | (pigment dispersion element) | Storage stability (ink) | Discharging stability |
| Example 1B | B | B | B | B | B | B |
| Example 2B | B | B | A | A | B | B |
| Example 3B | B | A | B | B | B | A |
| Example 4B | B | A | A | A | A | A |
| Example 5B | A | A | A | A | A | A |
| Example 6B | A | A | A | B | B | A |
| Example 7B | A | A | A | B | A | B |
| Example 8B | A | A | A | B | B | B |
| Example 9B | A | A | A | B | B | B |
| Example 10B | A | A | A | B | A | B |
| Example 11B | A | A | A | A | B | B |
| Example 12B | A | A | A | A | A | B |
| Example 13B | A | A | A | A | A | A |
| Example 14B | A | A | A | A | B | A |
| Example 15B | A | A | A | A | B | B |
| Example 16B | B | B | A | B | A | A |
| Example 17B | A | A | A | A | A | A |
| Example 18B | A | A | A | B | A | A |
| Example 19B | A | A | A | A | B | B |
| Example 20B | B | A | A | A | A | A |
| Example 21B | A | A | A | B | A | A |
| Example 22B | A | A | A | B | A | A |
| Comparative Example 1B | D | B | C | A | B | A |
| Comparative Example 2B | C | B | C | A | B | B |
| Comparative Example 3B | C | B | B | D | C | C |
| Comparative Example 4B | B | A | A | C | B | D |

The tolerable condition for usage is all B or better in every evaluation items in Tables 6 and 7.

As seen in the results, according to the present disclosure, an ink composition is provided which has excellent coloring, storage stability, and discharging stability.

According to detailed investigation about the results, it is found that good results are obtained for the copolymer having a structure unit having a diphosphonic acid group, the pigment having no peaks, the pigment represented by Chemical formula 1a having no peak at a Bragg (2θ±0.2°) angle in a range of 2θ of from 28.0° to 29.0° in a CuKα X-ray diffraction spectrum having a wavelength of 1.541 Å, the content ratio of the structure unit represented by Chemical formula 2 in a range of from 10% by weight to 60% by weight, $R_1$ in Chemical formula 2 being a methyl group, and the structure unit represented by Chemical formula 3 or Chemical formula 4.

Moreover, it is found that an ink composition having excellent discharging stability is provided when the weight average molecular weight of the polymer having the structure unit having a diphosphonic acid group ranges from 4,000 to 50,000.

Furthermore, according to the present disclosure, an ink cartridge having a container to accommodate the ink composition, an inkjet recording device using the ink composition, and printed matter are also provided.

According to the present invention, an ink composition is provided which has excellent coloring, storage stability, and discharging stability.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink composition comprising:
a pigment represented by Chemical formula 1a or Chemical formula 1b;
a polymer comprising a structure unit having a diphosphonic acid group;
a hydrosoluble solvent; and
water,
wherein when the pigment is represented by Chemical formula 1a, the pigment satisfies the relation 1: Y/X≤0.800, where X represents a peak intensity at a Bragg (2θ±0.2°) angle in a range of 2θ of from 5.5° to 6.0° and Y represents a peak intensity at a Bragg (2θ±0.2°) angle in a range of 2θ of from 26.5° to 27.5°, in a CuKα X-ray diffraction spectrum having a wavelength of 1.541 Å, Chemical formula 1a

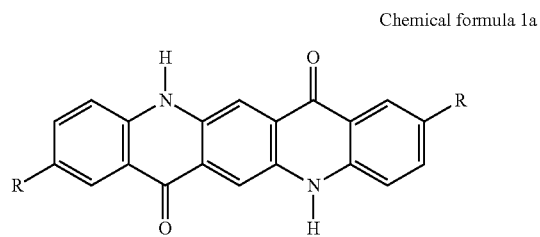

where R each, independently represents hydrogen atoms, methyl groups, or chlorine atoms,
wherein when the pigment is represented by Chemical formula 1b, the pigment satisfies the relation 2: Y'/X'≤0.200, where X' represents a peak intensity at a Bragg (2θ±0.2°) angle in a range of 2θ of from 26.5° to 27.5° and Y' represents a peak intensity at a Bragg (2θ±0.2°) angle in a range of 2θ of from 11.0° to 11.5°, in a CuKα X-ray diffraction spectrum having a wavelength of 1.541 Å, Chemical formula 1b

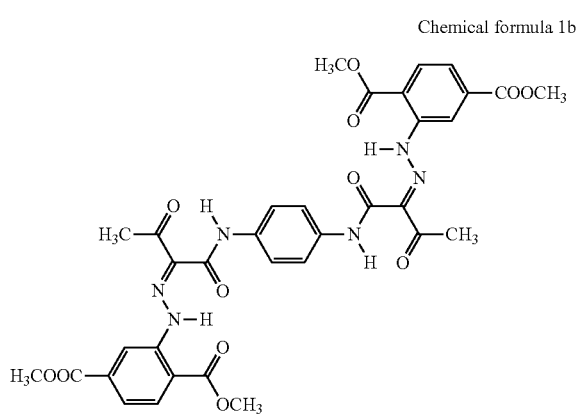

wherein the structure unit having a diphosphonic acid group is represented by Chemical formula 2

Chemical formula 2

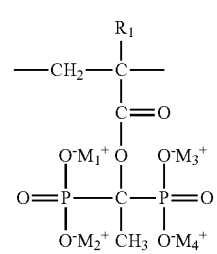

where $R_1$ represents a hydrogen atom or a methyl group and $M_1^+$, $M_2^+$, $M_3^+$, and $M_4^+$ each, independently represent alkali metal ions, organic ammonium ions, or hydrogen ions.

2. The ink composition according to claim 1, wherein the polymer comprising a structure unit having a diphosphonic acid group is a copolymer comprising the structure unit having a diphosphonic acid group.

3. The ink composition according to claim 1, wherein when the pigment is represented by Chemical formula 1a, the pigment has no peak at a Bragg (2θ±0.2°) angle in a range of 2θ of from 28.0° to 29.0° in a CuKα X-ray diffraction spectrum having a wavelength of 1.541 Å.

4. The ink composition according to claim 1, wherein the structure unit represented by Chemical formula 2 accounts for 10% by weight to 60% by weight in the polymer comprising a structure unit having a diphosphonic acid group.

5. The ink composition according to claim 1, wherein $R_1$ in Chemical formula 2 is a methyl group.

6. The ink composition according to claim 1, wherein the polymer comprising a structure unit having a diphosphonic acid group comprises a structure unit represented by Chemical formula 3 or Chemical formula 4, Chemical formula 3

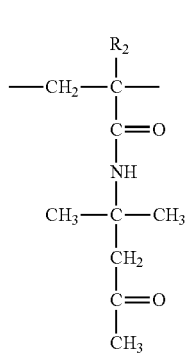

where $R_2$ represents a hydrogen atom or a methyl group,

Chemical formula 4

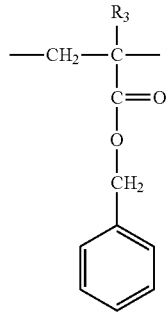

where $R_3$ represents a hydrogen atom or a methyl group.

7. The ink composition according to claim 1, wherein the polymer comprising a structure unit having a diphosphonic acid group has a weight average molecular weight of from 4,000 to 50,000.

8. An ink cartridge comprising:
a container to accommodate the ink composition of claim 1.

9. An inkjet recording device comprising:
a container to accommodate the ink composition of claim 1; and
a recording head to discharge the ink composition of claim 1 supplied from the container.

10. Recorded matter comprising:
a recording medium; and
an image or information recorded on the recording medium using the ink composition of claim 1.

* * * * *